US011687864B2

(12) United States Patent
Tang et al.

(10) Patent No.: US 11,687,864 B2
(45) Date of Patent: *Jun. 27, 2023

(54) METHOD AND SYSTEM FOR SUMMARIZING USER ACTIVITIES OF TASKS INTO A SINGLE ACTIVITY SCORE USING MACHINE LEARNING TO PREDICT PROBABILITIES OF COMPLETENESS OF THE TASKS

(71) Applicant: Clari Inc., Sunnyvale, CA (US)

(72) Inventors: Lei Tang, Milpitas, CA (US); MohamadAli Torkamani, Sunnyvale, CA (US); Mahesh Subedi, Sunnyvale, CA (US); Kurt Leafstrand, Saratoga, CA (US)

(73) Assignee: CLARI INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,423

(22) Filed: Aug. 1, 2022

(65) Prior Publication Data
US 2023/0051520 A1 Feb. 16, 2023

Related U.S. Application Data

(63) Continuation of application No. 17/569,915, filed on Jan. 6, 2022, now Pat. No. 11,405,476, which is a
(Continued)

(51) Int. Cl.
*G06Q 10/0639* (2023.01)
*G06Q 10/0631* (2023.01)
(Continued)

(52) U.S. Cl.
CPC ... *G06Q 10/06393* (2013.01); *G06Q 10/0633* (2013.01); *G06Q 10/063114* (2013.01);
(Continued)

(58) Field of Classification Search
CPC ..... G06Q 10/06393; G06Q 10/063114; G06Q 10/0633; G06Q 10/109; H04L 67/535; G06N 20/00; G06F 18/2132
See application file for complete search history.

(56) References Cited

U.S. PATENT DOCUMENTS 6,578,005 B1 6/2003 Lesaint et al.
7,480,623 B1 1/2009 Landvater
(Continued)

FOREIGN PATENT DOCUMENTS

WO 0210961 A2 2/2002

OTHER PUBLICATIONS

Lepage, Michael, "Level of Effort and Percent Complete," Oct. 16, 2013, PlanAcademy, https://www.planacademy.com/level-of-effort-percent-complete/, p. -13. (Year:2013.

*Primary Examiner* — Michael Won
(74) *Attorney, Agent, or Firm* — Womble Bond Dickinson (US) LLP

(57) ABSTRACT

Activity data of a set of tasks as a training set is obtained from a list of communication platforms associated with the tasks. For each of the tasks in the training set, a set of activity metrics is compiled according to a set of predetermined activity categories based on the activity data of each task. The activity metrics of all of the tasks in the training set are aggregated based on the activity categories to generate a data matrix. A principal component analysis is performed on the metrics of its covariance matrix to derive an activity dimension vector, where the activity dimension vector represents a distribution pattern of the activity metrics of the tasks. The activity dimension vector can be utilized to determine an activity score of a particular task, where the activity score of a task can be utilized to estimate a probability of completeness of the task.

20 Claims, 21 Drawing Sheets

Related U.S. Application Data continuation of application No. 15/688,758, filed on Aug. 28, 2017, now Pat. No. 11,416,799.

(51) Int. Cl.
    *G06Q 10/0633* (2023.01)
    *H04L 67/50* (2022.01)
    *G06Q 10/109* (2023.01)
    *G06N 20/00* (2019.01)

(52) U.S. Cl.
    CPC ......... *G06Q 10/109* (2013.01); *H04L 67/535* (2022.05); *G06N 20/00* (2019.01)

(56) References Cited

U.S. PATENT DOCUMENTS

| | | | |
|---|---|---|---|
| 7,519,173 B2 | 4/2009 | Flores et al. | |
| 8,005,700 B2 | 8/2011 | Amitabh et al. | |
| 8,479,285 B2 | 7/2013 | Moyle et al. | |
| 9,189,968 B2 * | 11/2015 | Supanc | G09B 7/04 |
| 9,239,719 B1 | 1/2016 | Feinstein et al. | |
| 9,600,774 B1 * | 3/2017 | Biemueller | G06N 5/04 |
| 10,148,546 B2 * | 12/2018 | Venkatraman | H04L 67/535 |
| 10,261,837 B2 * | 4/2019 | Chen | H04L 47/781 |
| 10,798,150 B2 * | 10/2020 | Zyto | H04L 67/10 |
| 10,846,643 B2 | 11/2020 | Xu et al. | |
| 10,909,441 B2 * | 2/2021 | Gao | G06N 3/006 |
| 10,956,455 B2 | 3/2021 | Subedi | |
| 2002/0010961 A1 | 1/2002 | Brown | |
| 2003/0068097 A1 | 4/2003 | Wilson et al. | |
| 2004/0015556 A1 | 1/2004 | Chopra | |
| 2005/0038687 A1 | 2/2005 | Galdes | |
| 2005/0114829 A1 | 5/2005 | Robin et al. | |
| 2006/0085220 A1 | 4/2006 | Sherwood et al. | |
| 2007/0192162 A1 | 8/2007 | Simons et al. | |
| 2007/0250377 A1 | 10/2007 | Hill et al. | |
| 2007/0282658 A1 | 12/2007 | Brintle | |
| 2008/0049022 A1 | 2/2008 | Sherb et al. | |
| 2009/0106691 A1 | 4/2009 | Ballard et al. | |
| 2009/0138301 A1 | 5/2009 | Wan | |
| 2009/0216571 A1 | 8/2009 | Sunshine et al. | |
| 2009/0234686 A1 | 9/2009 | Chakra et al. | |
| 2009/0287532 A1 | 11/2009 | Cohen et al. | |
| 2009/0313121 A1 | 12/2009 | Post et al. | |
| 2010/0057628 A1 | 3/2010 | Trinidad et al. | |
| 2010/0313009 A1 | 12/2010 | Combet et al. | |
| 2011/0010340 A1 | 1/2011 | Hung et al. | |
| 2011/0078260 A1 | 3/2011 | Rashad et al. | |
| 2011/0246412 A1 | 10/2011 | Skelton | |
| 2011/0264483 A1 | 10/2011 | Nezhad et al. | |
| 2012/0046996 A1 | 2/2012 | Shah et al. | |
| 2012/0150888 A1 | 6/2012 | Hyatt et al. | |
| 2012/0173638 A1 | 7/2012 | Vymenets et al. | |
| 2012/0246027 A1 | 9/2012 | Martin | |
| 2013/0080201 A1 | 3/2013 | Miller | |
| 2013/0218640 A1 | 8/2013 | Kidder et al. | |
| 2013/0246119 A1 | 9/2013 | Slaughenhoupt | |
| 2013/0318533 A1 | 11/2013 | Aghassipour et al. | |
| 2013/0318589 A1 | 11/2013 | Ford et al. | |
| 2014/0012616 A1 | 1/2014 | Moshenek | |
| 2014/0156757 A1 | 6/2014 | Zhang et al. | |
| 2014/0226800 A1 | 8/2014 | Aggarwal et al. | |
| 2014/0244351 A1 | 8/2014 | Symons | |
| 2014/0249882 A1 | 9/2014 | Li | |
| 2014/0304034 A1 | 10/2014 | Mitchell et al. | |
| 2015/0051957 A1 | 2/2015 | Griebeler et al. | |
| 2015/0121299 A1 | 4/2015 | Snyder et al. | |
| 2015/0178666 A1 | 6/2015 | Green et al. | |
| 2015/0348589 A1 | 12/2015 | Barisano, Iii et al. | |
| 2016/0071118 A1 | 3/2016 | Chiao et al. | |
| 2016/0150280 A1 | 5/2016 | Cui et al. | |
| 2016/0155137 A1 | 6/2016 | Harsha et al. | |
| 2016/0162779 A1 | 6/2016 | Marcus et al. | |
| 2016/0253706 A1 | 9/2016 | Kursar | |
| 2016/0335896 A1 | 11/2016 | Iwamoto | |
| 2017/0024427 A1 | 1/2017 | Daly et al. | |
| 2017/0083572 A1 | 3/2017 | Tankersley et al. | |
| 2017/0102912 A1 | 4/2017 | Jambulingam et al. | |
| 2017/0286978 A1 | 10/2017 | Govindarajan et al. | |
| 2017/0308986 A1 | 10/2017 | Simpson et al. | |
| 2018/0005171 A1 | 1/2018 | Harsha et al. | |
| 2018/0005253 A1 | 1/2018 | Megahed et al. | |
| 2018/0012136 A1 | 1/2018 | French et al. | |
| 2018/0150783 A1 | 5/2018 | Xu et al. | |
| 2018/0211195 A1 | 7/2018 | Trammell et al. | |
| 2018/0315062 A1 | 11/2018 | Parekh et al. | |
| 2019/0026786 A1 | 1/2019 | Khoury et al. | |
| 2019/0066020 A1 | 2/2019 | Allen | |
| 2019/0066021 A1 | 2/2019 | Tang et al. | |
| 2019/0108471 A1 | 4/2019 | Widanapathirana et al. | |
| 2019/0147509 A1 | 5/2019 | Mehta et al. | |
| 2019/0361866 A1 | 11/2019 | Rogynskyy et al. | |
| 2019/0361890 A1 | 11/2019 | Rogynskyy et al. | |
| 2020/0184407 A1 | 6/2020 | Mappus et al. | |
| 2020/0285936 A1 | 9/2020 | Sen | |
| 2020/0372016 A1 | 11/2020 | Rogynskyy et al. | |
| 2020/0379755 A1 | 12/2020 | Boada et al. | |
| 2021/0150345 A1 | 5/2021 | Abati et al. | |
| 2021/0389817 A1 | 12/2021 | Spinelli et al. | |
| 2022/0004915 A1 | 1/2022 | Neumann | |
| 2022/0076149 A1 | 3/2022 | Faruquie et al. | |

\* cited by examiner

| Type 401 | Timestamp 402 | Task ID 403 |
|---|---|---|
| Email sent | | Task 1 |
| Email received | | Task 3 |
| IM message sent | | Task 2 |
| IM message received | | Task 5 |
| Meeting scheduled | | Task 12 |
| Phone call placed | | Task 4 |
| Phone call received | | Task 8 |
| ... | ... | ... |

| Metrics ID 501 | Metrics Data 502 |
|---|---|
| Future meetings scheduled | 10 |
| Emails sent last week | 5 |
| Emails received last week | 2 |
| Email sent/received ratio last week | 2.5 |
| Emails sent 2 weeks ago | 10 |
| Phone call placed | |
| Phone call received | |
| ... | ... |

FIG. 5

| Task ID | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Emails sent | 5 | 5 | 4 | 3 | 2 | 2 | 10 | 15 | 20 | 0 | 0 | 30 | 40 | 30 | 2 | 2 | 100 | 1000 | 20 | 10 |
| Normalized emails sent | 0.4 | 0.4 | 0.3 | 0.3 | 0.2 | 0.2 | 0.5 | 0.6 | 0.7 | 0 | 0 | 0.8 | 0.8 | 0.8 | 0.2 | 0.2 | 0.9 | 1.0 | 0.7 | 0.5 |

FIG. 6A

| Percentile Buckets | 0 | 10% | 20% | 30% | 40% | 50% | 60% | 70% | 80% | 90% | 100% |
|---|---|---|---|---|---|---|---|---|---|---|---|
| Percentiles | 0 | 1 | 2 | 2.5 | 4.5 | 7.5 | 12.5 | 20 | 30 | 70 | 1000 |

FIG. 6B

|  | Metrics 1 (e.g., email sent) | Metrics 2 (e.g., email received) | Metrics 3 (e.g., future meetings) | ... |
|---|---|---|---|---|
| Task 1 | 0.8 | 0.9 | | |
| Task 2 | 0.5 | 0.2 | | |
| Task 3 | 1 | 0 | | |
| Task 4 | | | | |
| ... | ... | ... | ... | ... |

| Task Stages | Stage 1 (e.g., Omitted) | Stage 2 (e.g., pipeline) | Stage 3 (e.g., upside) | Stage 4 (e.g., strong upside) | Stage 5 (e.g., committed) |
|---|---|---|---|---|---|
| Task Score | 10% | 20% | 40% | 70% | 90% |

FIG. 12

METHOD AND SYSTEM FOR SUMMARIZING USER ACTIVITIES OF TASKS INTO A SINGLE ACTIVITY SCORE USING MACHINE LEARNING TO PREDICT PROBABILITIES OF COMPLETENESS OF THE TASKS

This is a continuation application of U.S. patent application Ser. No. 17/569,915, filed Jan. 6, 2022, which is a continuation of U.S. patent application Ser. No. 15/688,758, filed Aug. 28, 2017. The disclosure of the aforementioned applications is incorporated by reference in its entirety.

FIELD OF THE INVENTION

Embodiments of the present invention relate generally to task management. More particularly, embodiments of the invention relate to summarizing user activities into a single activity score to indicate probability of completeness of a task.

BACKGROUND

A project manager managing a team of team members is constantly striving to be aware of the progress in each of the projects managed by his team to be able to guide to work effectively and efficiently. People tend to interact with projects through different forms. These activities reflect how intense and strong the engagement is, beyond traditional project management records.

Traditionally, people use project management records to track progress of projects. Yet, it requires manual entry of the records in a record database. Hence, the information from project management records tend to be inaccurate and not up-to-date. Therefore, the industry has been trying to track user activities through other channels, such as email exchange, attachment shared, scheduled calendar meetings, telephone conversations, or text messages. While it is fine to examine individual type of activity, it is difficult to scrutinize all types of activities, especially to prioritize hundreds or thousands of projects.

Existing solutions use some predefined rules to summarize activities. However, this kind of rules are very ad-hoc and domain specific. In other words, it is ungrounded to answer questions such as how many received emails equals one sent email or does one meeting account for five emails, etc.

BRIEF DESCRIPTION OF THE DRAWINGS

Embodiments of the invention are illustrated by way of example and not limited to the figures of the accompanying drawings in which like references indicate similar elements.

FIG. 4 is a block diagram illustrating an example of a data structure logging the activities of tasks according to one embodiment.

FIG. 5 is a block diagram illustrating an example of metrics of a particular task according to one embodiment.

FIGS. 6A and 6B are block diagram illustrating a normalized process of activity data according to one embodiment.

FIG. 7 shows an example of a data matrix according to one embodiment.

FIG. 12 shows an example of a task scoring table according to one embodiment.

DETAILED DESCRIPTION

Figure 1A:
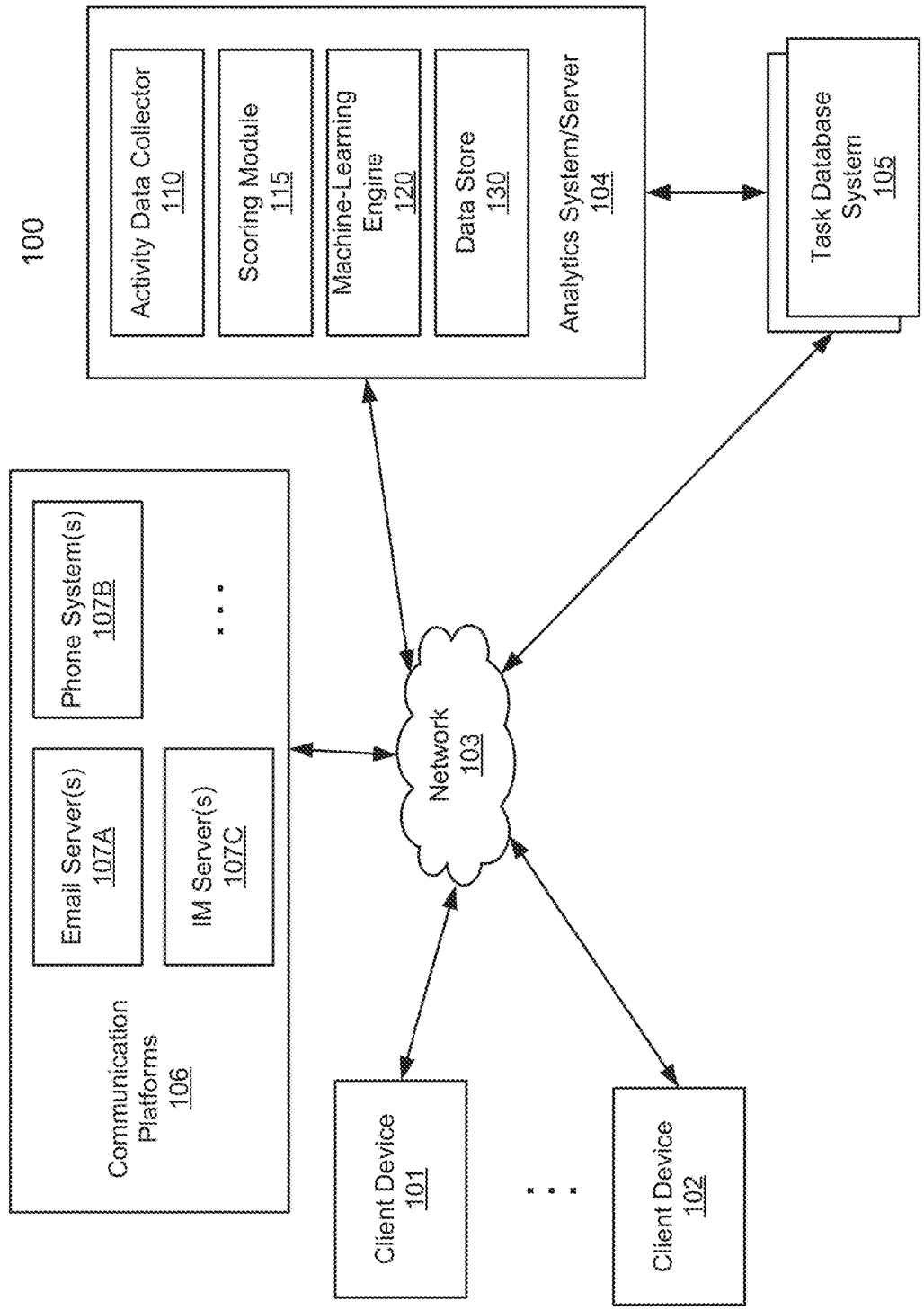
FIGS. 1A and 1B are block diagrams illustrating a network configuration according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an activity scoring system is utilized to summarize all kinds of user activities such as email sent, received, meetings, telephone conversations, text messages, into one single score, which enables users to view and compare tasks or projects of different activity volumes. One or more algorithms and/or models are developed to remove outliers and make all types of activity comparable. Meanwhile, the activity scores are normalized, so that the algorithms/models are domain independent. In other words, for one vertical or dimension, sending 100 emails within one week is normal, but in another vertical or dimension, one or two brief touches every two weeks might be appropriate. The algorithm is able to remove this overall bias or trend of one particular vertical, and normalize the scores to be in a certain range like zero to 100.

In addition, the system can also derive a project/task score from project/task development data or history (e.g., project/task progress such as project/task stages or milestones) to quantify the risk of completing the projects/tasks. The system is able to present both activity scores and project/task scores in a two-by-two chart on a graphical user interface (GUI), with x-axis being the project/task score, and y-axis being the activity score. Each graphical representation represents one project or task, with the size of the graphical representation indicating certain numerical attribute (e.g., project/task size). One can also use different appearances (e.g., shapes and/or colors) to encode other attributes of projects/tasks like forecast category, or stage, etc.

According to one aspect of the invention, activity data of a set of tasks as a training set is obtained from a list of communication platforms (e.g., email, calendar, instant messaging or IM, social network platforms) associated with the tasks. For each of the tasks in the training set, a set of activity metrics is compiled according to a set of predetermined activity categories based on the activity data of each task. The activity metrics of all of the tasks in the training set are aggregated based on the activity categories to generate a data matrix. A principal component analysis is performed on the metrics of its covariance matrix to derive an activity dimension vector, where the activity dimension vector represents a distribution pattern of the activity metrics of the tasks. The activity dimension vector can be utilized to determine an activity score of a particular task, where the activity score of a task can be utilized to estimate a probability of completeness of the task. Subsequently, in response to a first task (e.g., an unknown task or one of the tasks in the training set) having a set of activity metrics, the activity metrics of the unknown task are projected onto the activity dimension vector to derive a single activity score. A probability of completeness of the first task can then be predicted or estimated based on the activity score of the first task.

According to another aspect of the invention, activity data of a first set of known completed tasks and a second set of known incomplete tasks within a predetermined period of time in the past is obtained from one or more communication platforms associated with the tasks (e.g., email, calendar, instant messaging or IM, social network platforms). A first data matrix having a first set of activity metrics is generated based on the activity data of the first set of known completed tasks. A second data matrix having a second set of activity metrics is generated based on the activity data of the second set of known incomplete tasks. A linear discriminant analysis (LDA) is performed on the metrics of the first data matrix and the second data matrix to derive an activity dimension vector, such that a high activity level of a task tends to be a completed task, while a low activity level of a task tends to be an incomplete task. The activity dimension vector represents a distribution pattern of the activity metrics of the known tasks. The activity dimension vector can be utilized to determine an activity score of an unknown task, where the activity score may be used to estimate a probability of completeness of the unknown task. Subsequently, in response to a first task (e.g., an unknown or new task to be competed) having a set of activity metrics, the activity metrics of the unknown task are projected onto the activity dimension vector to derive a single activity score. A probability of completeness of the first task can then be predicted or estimated based on the activity score of the first task.

According to a further aspect of the invention, an activity score for each of the tasks is determined based on activities of the task obtained from one or more communication platforms associated with the tasks (e.g., email, calendar, IM, social platforms). A task score is determined for each task based on a set of one or more predetermined features associated with the task. For each of the tasks, an appearance of a graphical representation (e.g., shapes and/or sizes of icons) is determined based on at least a portion of the features of the task. The graphical representations of all of the tasks are plotted and displayed on a two-dimensional (2D) space based on the activity scores (e.g., y-axis) and task scores (e.g., x-axis) of the tasks. A location of a graphical representation of a particular task can be utilized to predict or estimate a probability of completeness of that particular task.

Note that throughout this application, a project is utilized as an example of a task performed by a user of a group of users. A customer relationship management or CRM system is utilized as an example of a task database system, and the terms of "task database system" and "CRM system" are interchangeable terms for illustration purpose throughout the entire application.

FIG. 1A is a block diagram illustrating a network configuration according to one embodiment of the invention. Referring to FIG. 1A, system 100 includes, but is not limited to, one or more client systems 101-102 communicatively coupled to servers 104-105 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Network 103 may be any type of networks such as a local area network (LAN), a wide area network (WAN) such as the Internet, or a combination thereof, wired or wireless. Servers 104-105 can be any kinds of servers or a cluster of servers, such as, for example, Web servers, application servers, cloud servers, backend servers, etc.

Task database system/server 105 provides task data services to a variety of clients, which may be periodically or constantly accessed and updated by the clients for managing their task management data or other project management data. An example of task database system 105 is a CRM system that provides CRM data services. Task or CRM data includes any kinds of customer relationship management data, such as, for example, projects, tasks, deals, contracts, etc. The CRM services may be provided by a variety of CRM vendors, such as, for example Salesforce.com, SAP AG, Oracle, and Microsoft. CRM is a term that refers to practices, strategies and technologies that companies use to manage and analyze customer interactions and data throughout the customer lifecycle, with the goal of improving business relationships with customers, assisting in customer retention and driving sales growth. CRM systems are designed to compile information on customers across different channels or points of contact between the customer and the company, which could include the company's website, telephone, live chat, direct mail, marketing materials and social media.

In one embodiment, data analytics system or sever 104 (also referred to as a project management or task management system or server) provides task/project management and/or data analytics services to clients 101-102 based on CRM data provided by CRM system 105 as a data source. Note that although there is only one CRM system shown, multiple CRM systems may also be implemented, where project management system 104 may be implemented as a multi-tenancy system that can access multiple CRM systems concurrently over network 103. For example, a user of client device 101 may be associated with a first organization as a first corporate client to project management system 104, while a user of client device 102 may be associated with a second organization as a second corporate client to project management system 104. The first and second organizations may employ different ones of CRM systems 105. Also note that a CRM system is utilized as an example of data sources, however, other types of data sources or systems can also be applied.

In one embodiment, analytics system 104 includes, but it is not limited to, activity data collector 110, scoring module 115, machine learning engine 120, and data store 130. The data analytics system 104 may further include a user interface (not shown), which can be any kind of user interface (e.g., Web, graphical user interface or GUI, or command line interface or CLI) that allows users of client devices 101-102 to access the services provided by data analytics system 104. In one embodiment, such a service may include calculating an activity score of a particular task or project, where the activity score as a single score summaries all of the activities associated with the task. The activity score can be utilized to determine the probability of completeness of the task, i.e., whether the task will likely be completed on time. The activities may include a variety of communication activities concerning a task such as emails, calendar events, IM messages, phone calls, and/or social activities within a social community. A task refers to an operation or a set of operations performed by a user or users. For example, a task may be a project that can be any kind of projects such as a sales project (also referred to as an opportunity).

Data store 130 stores or caches CRM data of a variety of projects, which may be periodically updated from the corresponding data source(s) or data provider(s), in this example, CRM system(s) 105. Alternatively, a task manager (not shown) may directly access CRM system(s) 105 to query and retrieve the CRM data. Data stored in data store 130 can be maintained in a variety of data structures, such as tables or databases. The task manager can access data store 130 via a variety of application programming interfaces (APIs), database queries, or other suitable communication protocols (e.g., structured query language or SQL).

According to one embodiment, activity data collector 110 is configured to communicate with communication platforms or systems 106 to collect activity data from a variety of communication systems associated with a task (e.g., project), such as, for example, email and calendar system(s) 107A, phone system(s) 107B, and IM system(s) 107C, as well as other communication system (e.g., social networks). Activity data collector 110 may communicate with each of the communication systems 107A-107C via a specific application programmable interface (API) to search and retrieve specific activity data associated with a task.

For example, activity data collector 110 may search in email system 107A by one or more keywords of a task for any emails or calendar events (e.g., meetings) associated with the task. Alternatively, activity data collector 110 may search emails based on a user ID and a keyword associated with the task, where the user may be an owner or a team member of a team performing the task. In one embodiment, the activity data may include a number of emails sent or received for different time periods, a number of IM messages sent or received for different time periods, and a number of phone calls made for different time periods, etc. Activity data collector 110 collects all the activity data for a set of tasks (e.g., all tasks pending in task database system 105 or a set of known tasks performed in the past).

Based on the activity data of the tasks in the set, machine learning engine 120 is configured to generate an activity scoring model or a set of activity scoring rules. Once the activity model or rules have been generated, scoring module 115 is configured to determine an activity score for a particular task using the activity scoring model or rules. The activity score can be represented to a user or manager to estimate the probability of completeness of the task. In general, if the activity score of a task is relatively high, there is a higher chance of completing the task. Likewise, if the activity score of a task is relatively low, there is a higher chance of failure to complete the task.

According to another embodiment, a task score may also be calculated by scoring module 115 based on task data, which may be retrieved from task database system. In an example of a task being a project, the project information may be obtained from a CRM system. The task score may be determined based on the task stage of the task. For example, if the task stage is closer to a completed stage, a task score would be higher. In one embodiment, for a particular task, once the activity score and the task score have been determined, a graphical representation representing the task can be constructed and displayed in a 2D space (e.g., activity score vs. task score), where the appearance (e.g., size, shape, and/or color) of the graphical representation may be determined based on certain attributes of the task. In one embodiment, the x-axis may be represented by task scores while the y-axis may be represented by activity scores. Thus, based on the location of the graphical representation within the activity score vs. task score 2D space, one can easily determine the probability of completeness of the corresponding task.

Figure 1B:
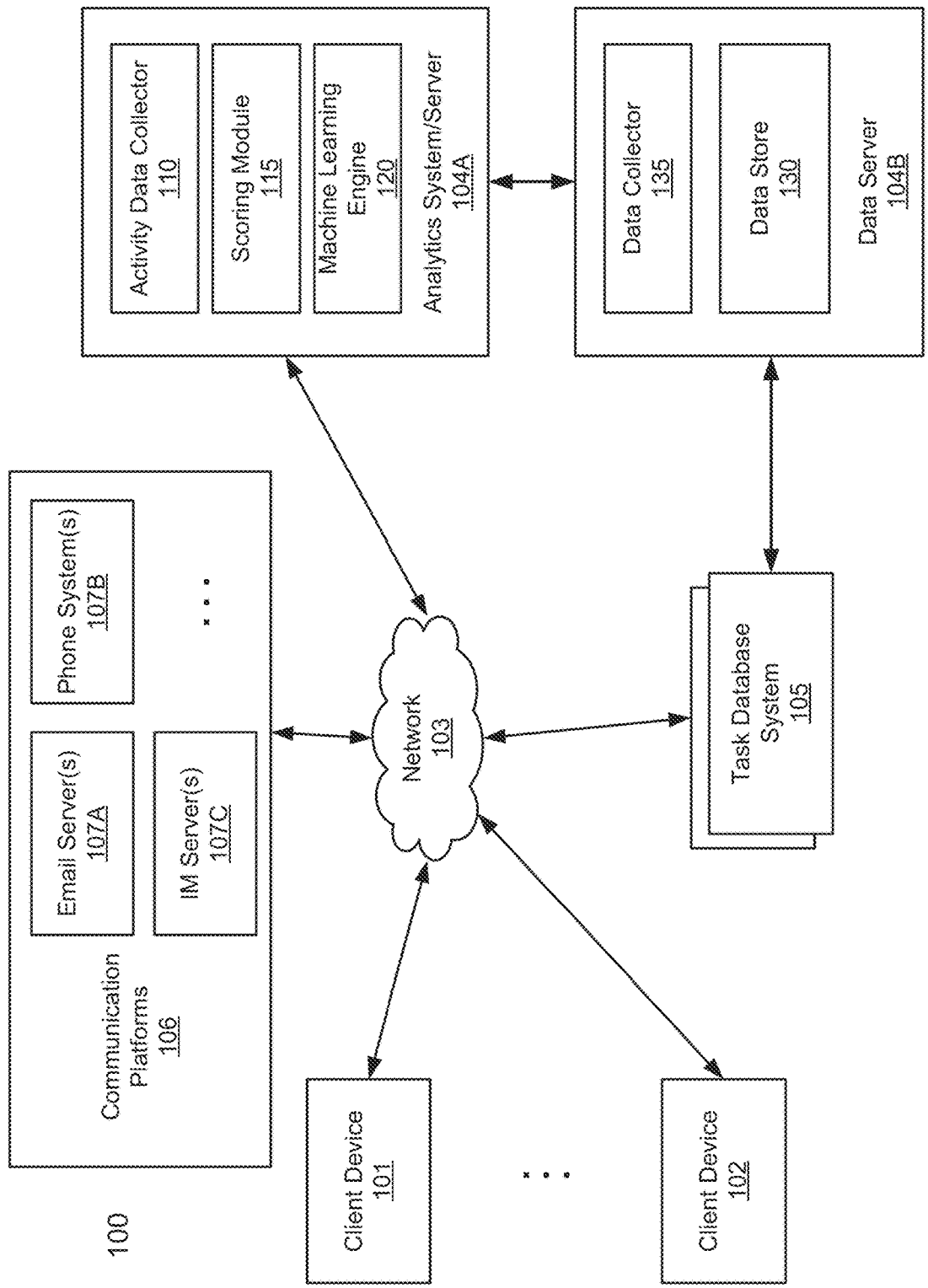

Although in this embodiment, data store 130 is maintained by data analytics system 104, however, data store 130 can be maintained in a dedicated data server that is a separate server from data analytics server 104 as shown in FIG. 1B. Referring now to FIG. 1B, in this embodiment, data analytics server 104A and data server 104B are implemented as separate servers, which may be operated by the same or different organizations or entities. Data store 130 is now maintained by data server 104B. Data server 104B further includes data collector 135 configured to periodically or constantly collect or update CRM data from data sources 105. Data analytics server 104A communicates with data server 104B using a variety of communication protocols to access task data stored in data store 130.

Figure 2:
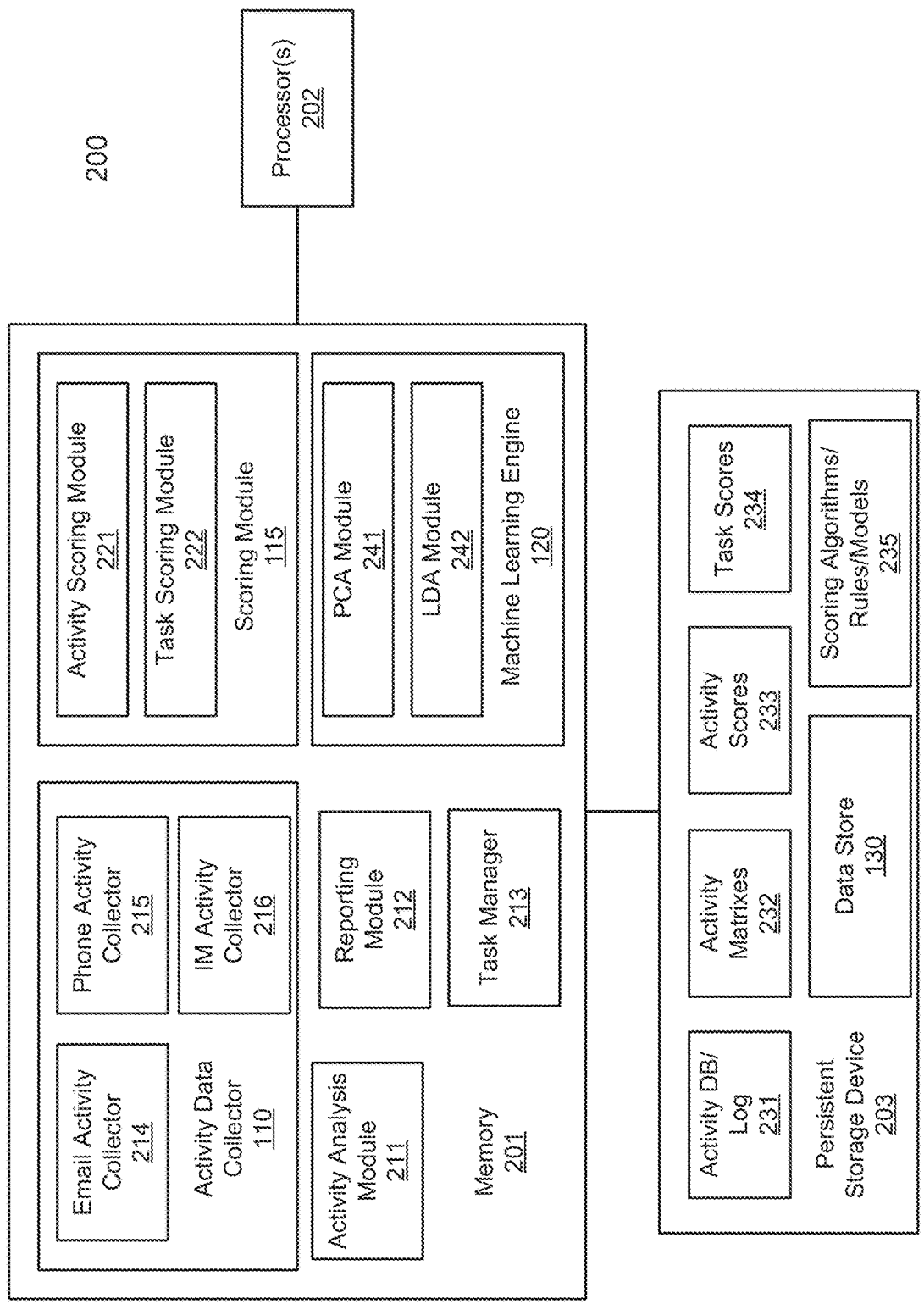
FIG. 2 is a block diagram illustrating an example of a data analytics system according to one embodiment of the invention.
Figure 3:
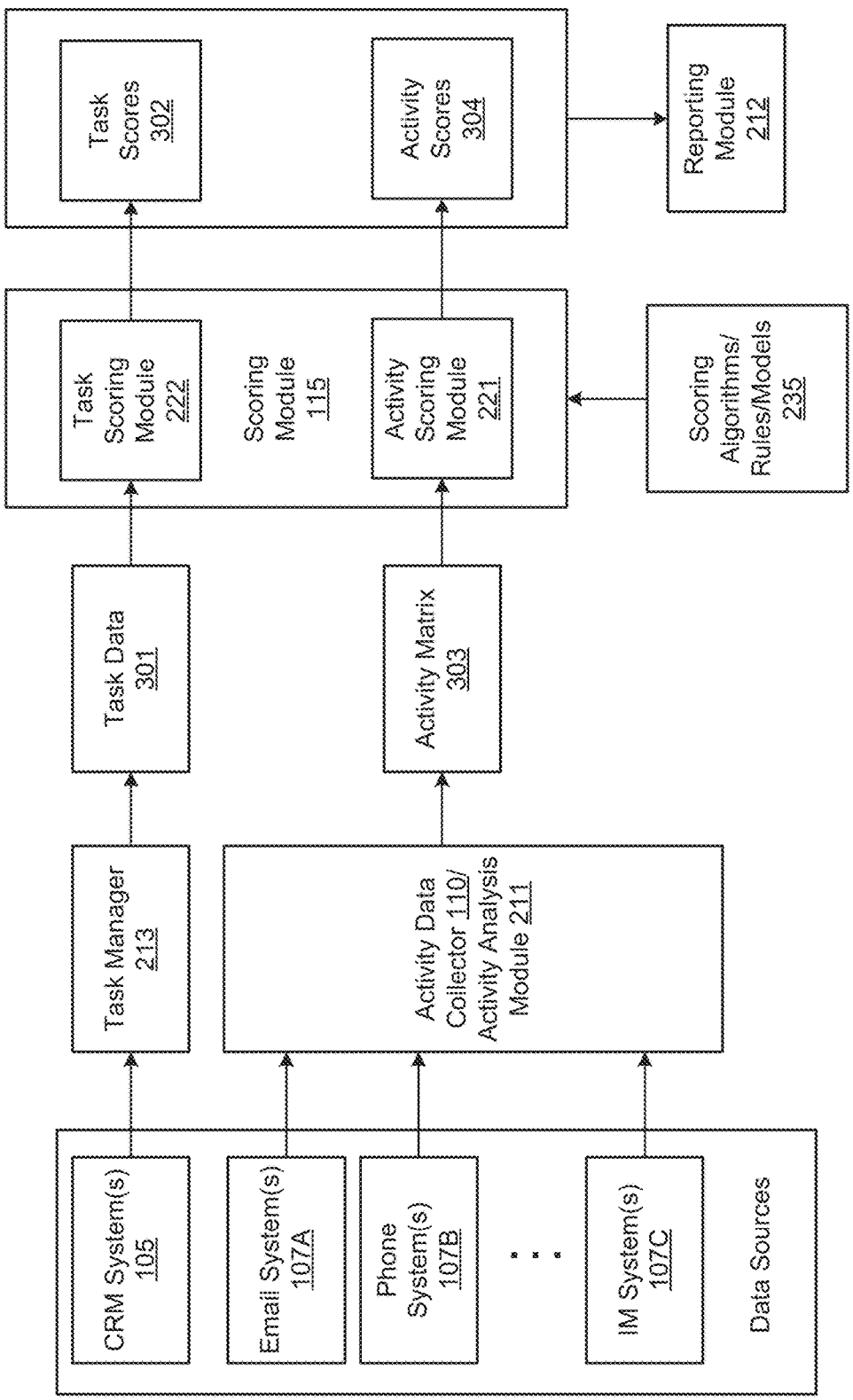
FIG. 3 is a processing flow diagram illustrating a process of determining a likelihood of a task to be completed using activity scores according to one embodiment.

FIG. 2 is a block diagram illustrating an example of a data analytics system according to one embodiment of the invention. System 200 may be implemented as part of data analytics system or server 104 of FIG. 1. Referring to FIG. 2, system 200 includes, but is not limited to, activity data collector 110, scoring module 115, and machine-learning engine 120. These components or modules can be implemented in software, hardware, or a combination thereof. Some of these components or modules may be integrated into fewer integrated components or modules. For example, these components or modules can be loaded in memory 201 (e.g., volatile memory such as random access memory or RAM) and executed by one or more processors 202 (e.g., microprocessors, central processing units or CPUs). Data store 130 is stored in persistent storage device 203, such as a hard disk, which may be maintained locally or remotely over a network. At least a portion of data stored in data store 130 may be cached in memory 201.

Referring to FIGS. 1A-1B and 2-3, according to one embodiment, for each of a set of selected tasks maintained in task database system 105, activity data collector 110 communicates with each of the communication platforms 107A-107C to collect activity data and stores the collected activity in activity database or data structure 231 maintained in persistent storage device 203. In one embodiment, activity data collector 110 includes email activity collector 214, phone activity collector 215, IM activity collector 216, as well as social activity collector (not shown). Email activity collector 214 is configured to access an email system such as email system 107A to collect any email and calendar event activities associated with any of the tasks maintained in task database system 105. Phone activity collector 215 is configured to collect any phone calls associated with the tasks conducted at different points in time. IM activity collector 216 is configured to collect any IM messages associated with the tasks at different points in time.

For each of the selected tasks, according to one embodiment, email activity collector 214 is configured to access email system 107A based on one or more keywords associated with the task, which may be a task ID, keywords from a title of the task, or keywords extracted from notes or description of the task. The collected emails may be the emails sent and received at different points in time. For the purpose of illustration only, a project between an organization entity and a customer or client is utilized as an example of a task. One or more users from the organization entity are considered as a project team to perform and complete the project for a customer or client. There will be communications between the user of the organization entity and the users of the customers. An email sent refers to an email sent from the organization entity to the corresponding customer or client of the project. An email received refers to an email received by the organization entity from the customer or client of the project. Similar terminology can be applicable to IM messages sent/received and phone calls placed/received, etc. In addition, email activity collector 214 further searches and collects calendar events that have been scheduled for the project. A calendar event may be a meeting or a reminder associated with a project.

For each of the selected tasks, phone activity collector 215 is configured to identify the phone calls associated with a particular task conducted at different points in time, for example, based on a phone number associated with a customer or client from a dialer log. Similar to an email, a phone call can be an outbound phone call placed from the organization entity or an inbound phone call received from a customer or client. Similarly, IM activity collector 216 is configured to collect IM messages exchanged between the organization entity and the customer or client at different points in time. A social activity collector (not shown) can also collect any social posts on a social community concerning a particular task/project.

The collected activity information may be stored in activity or event database 231. An example of activity database 231 is shown in FIG. 4. Referring to FIG. 4, log table 400 is utilized as an example of a data structure storing the collected activities. A database may also be implemented. In this example, table 400 includes a number of entries. Each entry stores one activity event, including type of the activity 401, a timestamp of the activity 402, and a task ID 403 of a task associated with the activity. The types of activities may include, but are not limited to, email sent, email received, IM message sent, IM message received, meeting, phone call placed, and phone call received, etc. Timestamp 402 records the time when the associated activity event occurred. Table 400 stores all the collected activities for all of the selected tasks in the set (also referred to as a training set of tasks). The training set is utilized to train and create a scoring model, algorithm, or a set of rules for determining an activity score, which will be described in details further below.

The collected activity data is referred to as raw activity data. Referring back to FIGS. 1A-1B and 2-3, based on the collected activity raw data, activity analysis module 211 is configured to perform an analysis on the activity data stored in activity database 231. For each task or project, activity analysis module 211 aggregates the activity events for the corresponding task and generates one or more metrics for the task.

Referring now to FIG. 5, which shows an example of metrics for a particular task, table 500 includes a number of entries, each entry corresponding one of the activity or event categories. Each entry summarizes a number of activity events 502 of a particular type or category of activity events 501. The types of activity events include, but are not limited to, future meetings, emails sent in a past predetermined time period, emails received in a past predetermined time period, a ratio between the emails sent and emails received, IM messages sent, IM messages received, phone calls placed, phone calls received, etc. A past predetermined time period can be since yesterday, last week, two weeks ago, a month ago, a year ago, etc. compared to a current time. Such a predetermined time period can be user configurable.

Due to various reasons, the collected raw activity event data could include outliers. In addition, it is difficult to compare different types of metrics based on the raw data, such as how many emails is equivalent to a meeting. In order to screen or filter out such outliers and the incompatible ranges of data, in one embodiment, a percentile smoothing operation is performed for each of the metrics of all tasks by a percentile smoothing module (not shown), which may be implemented as a part of activity analysis module 211.

For each metric representing an activity or event category, for the purpose of illustration, a number of emails sent, the percentile smoothing module obtains the number of emails sent associated with all tasks or projects as shown in FIG. 6A. In this example as shown in FIG. 6A, there are 20 tasks, each task has a specific number of emails that have been sent. Based on the data distribution, the percentile smoothing module computes the percentiles, in this example, with an increment of 10%, as shown in FIG. 6B.

According to one embodiment, all the numbers of the second row of FIG. 6A are sorted to derive FIG. 6B and then the third row of FIG. 6A is determined. For the example, after sorting the values of the second row of FIG. 6A, the sorted numbers would be:

0, 0, 2, 2, 2, 2, 3, 4, 5, 5, 10, 10, 15, 20, 20, 30, 30, 40, 100, 1000

There are total 20 numbers in this example. If we only care about 10% incremental, then there will be a total of 11 percentile buckets and we need to identify 11 thresholds for 0%, 10%, 20%, 30%, 40%, 50%, 60%, 70%, 80%, 90%, and 100%. The percentile bucket allocation will be:

|0, 0|2, 2|2, 2|3, 4|5, 5|10, 10|15, 20|20, 30|30, 40|100, 1000|

The percentile smoothing module then maps the raw metric data to a percentile bucket or percentile bin based on its neighboring percentiles. For example, raw number of 5 would be mapped to 40% as it is between the percentiles 4.5 and 7.5 in FIG. 6B, and hence it will be mapped to 40% (or 0.4) in FIG. 6A. Similarly, raw data of 40 would be mapped to 80% since it is between 30 and 70 in FIG. 6B, and hence it will be mapped to 80% (or 0.8) in FIG. 6A. Meanwhile, any data beyond the range of 0 to 100 percentiles would be bounded to the closest percentile bucket. For example, a raw data of 1500 will be mapped to 100% (or 1.0). After the percentile smoothing operation, all data of all tasks for the same metric will be in a range between 0.0 and 1.0.

In general, some of the activity events may be more important than others dependent upon the timeline of which the activity events occurred. For example, an activity event occurred yesterday may be more important than an activity event occurred a week ago, which is more important than an activity event occurred a month ago, etc. The rationale behind it is that a more recent activity event would likely reflect the actual status or state of the task accurately than an activity event happened a while ago, as data or activities of a task or project may change from time to time.

In one embodiment, an importance factor is determined for each of the activity event categories based on a time attribute associated with the activity event category. This process is referred to as a time decay process that can be performed by a time decay module (not shown), which may be implemented as a part of activity analysis module 211. As a result, an important factor for an older activity event category is smaller (or larger dependent upon the specific configuration) than an important factor for a more recent activity event category. In a particular embodiment, an important factor can be determined based on the following formula:

$$importance = \exp(-\beta \Delta t)$$

Variable $\Delta t$ is the recency value representing how recent the corresponding metric is (e.g., 1 indicating 1 week ago), and $\beta > 0$ is a decaying factor. Thus, naturally, remote events would have smaller importance. For each of the metrics or activity event categories, the normalized values of the metric (e.g., emails sent last week) are then multiplied by the corresponding importance factor.

Based on all of the normalized metrics of all tasks (e.g., emails sent or received in different time periods, IM messages sent or received in different time periods, meetings conducted during different time periods, etc.), according to one embodiment, activity analysis module 211 is configured to aggregate and combine all of the metrics of all tasks to generate a single matrix. An example of such a matrix is shown in FIG. 7. Referring now to FIG. 7, matrix 700 includes a number of rows or entries, each entry corresponding to one of the tasks. Each entry maps a task to a number of metrics (e.g., normalized metrics) associated with the tasks. Each metric corresponds to one of the predetermined activity event categories. The matrix as shown in FIG. 7 is referred to as a data matrix.

Based on the matrix, machine learning engine 120 performs a machine learning process on the data matrix to develop an activity scoring model (or algorithm or rules). The activity scoring model can be utilized to determine an activity score for a particular task based on metrics of the task. In one embodiment, machine learning engine 120 includes a principal component analysis (PCA) module 241 to perform a PCA analysis on the data matrix to determine a dimension vector of its covariance matrix, where the dimension vector represents a distribution pattern of the metrics of the covariance matrix.

In probability theory and statistics, a covariance matrix (also known as dispersion matrix or variance-covariance matrix) is a matrix whose element in the i, j position is the covariance between the $i^{th}$ and $j^{th}$ elements of a random vector. A random vector is a random variable with multiple dimensions. Each element of the vector is a scalar random variable. Each element has either a finite number of observed empirical values or a finite or infinite number of potential values. The potential values are specified by a theoretical joint probability distribution.

Intuitively, the covariance matrix generalizes the notion of variance to multiple dimensions. As an example, the variation in a collection of random points in two-dimensional space cannot be characterized fully by a single number, nor would the variances in the x and y directions contain all of the necessary information; a 2×2 matrix would be necessary to fully characterize the two-dimensional variation. Because the covariance of the $i^{th}$ random variable with itself is simply that random variable's variance, each element on the principal diagonal of the covariance matrix is the variance of one of the random variables. Because the covariance of the $i^{th}$ random variable with the $j^{th}$ one is the same thing as the covariance of the $j^{th}$ random variable with the $i^{th}$ one, every covariance matrix is symmetric. In addition, every covariance matrix is positive semi-definite.

Principal component analysis is a statistical procedure that uses an orthogonal transformation to convert a set of observations of possibly correlated variables into a set of values of linearly uncorrelated variables called principal components (or sometimes, principal modes of variation). The number of principal components is less than or equal to the smaller of the number of original variables or the number of observations. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is sensitive to the relative scaling of the original variables.

PCA can be thought of as fitting an n-dimensional ellipsoid to the data, where each axis of the ellipsoid represents a principal component. If some axes of the ellipsoid is small, then the variance along that axis is also small, and by omitting that axis and its corresponding principal component from our representation of the dataset, we lose only a commensurately small amount of information.

To find the axes of the ellipsoid, processing logic must first subtract the mean of each variable from the dataset to center the data around the origin. Then, the processing logic can compute the covariance matrix of the data, and calculate the eigenvalues and corresponding eigenvectors of this covariance matrix. Then, the processing logic must orthogonalize the set of eigenvectors, and normalize each to become unit vectors. Once this is done, each of the mutually orthogonal, unit eigenvectors can be interpreted as an axis of the ellipsoid fitted to the data. The proportion of the variance that each eigenvector represents can be calculated by dividing the eigenvalue corresponding to that eigenvector by the sum of all eigenvalues as set forth in the following equations.

$$maximize_w w^T \sum w$$

$$\text{subject to } \|w\|_2 = 1$$

Figure 8A:
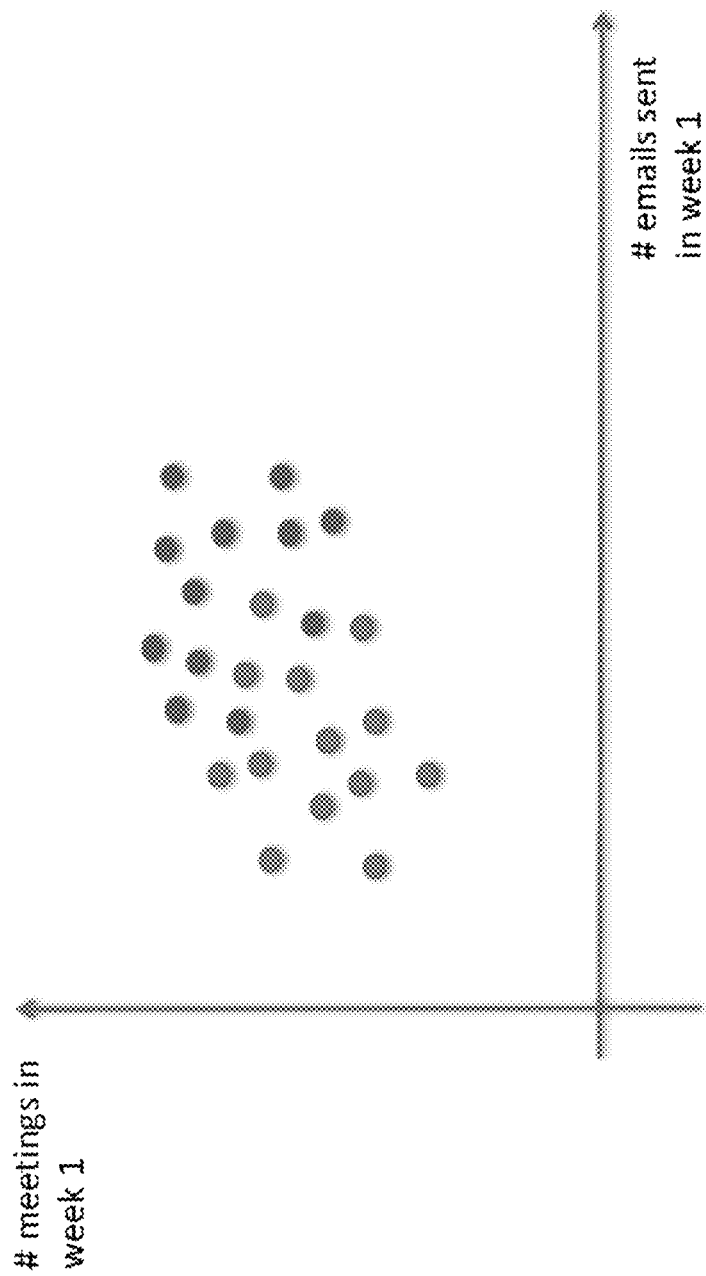
FIGS. 8A-8D are diagrams illustrating a principal component analysis used to determine activity scores according to one embodiment.
Figure 8B:
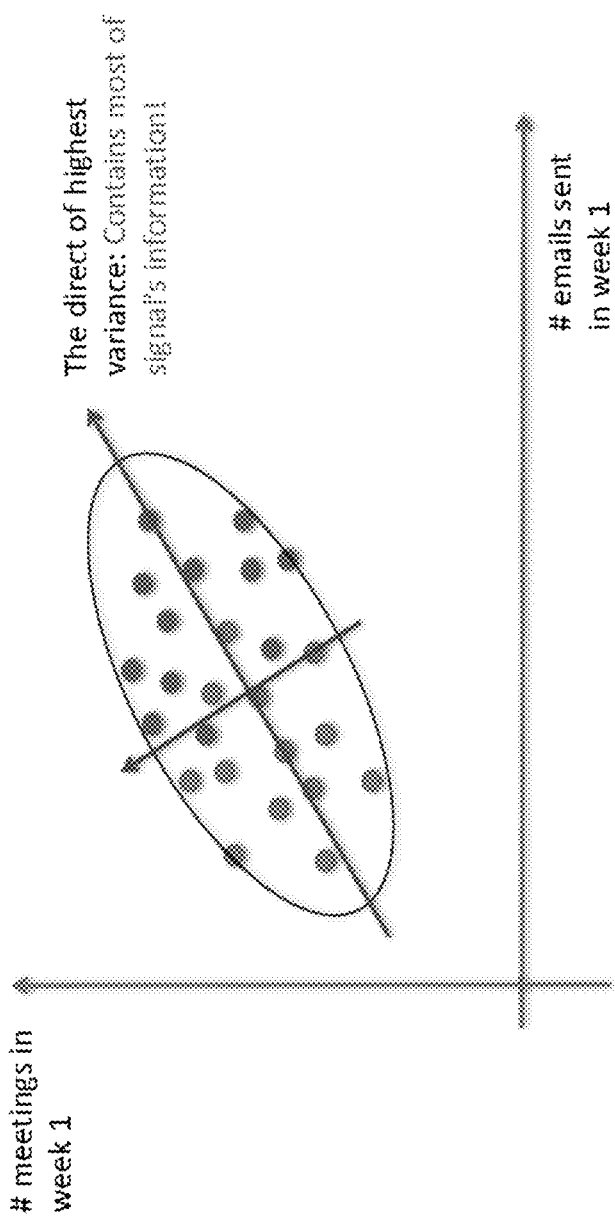
Figure 8C:
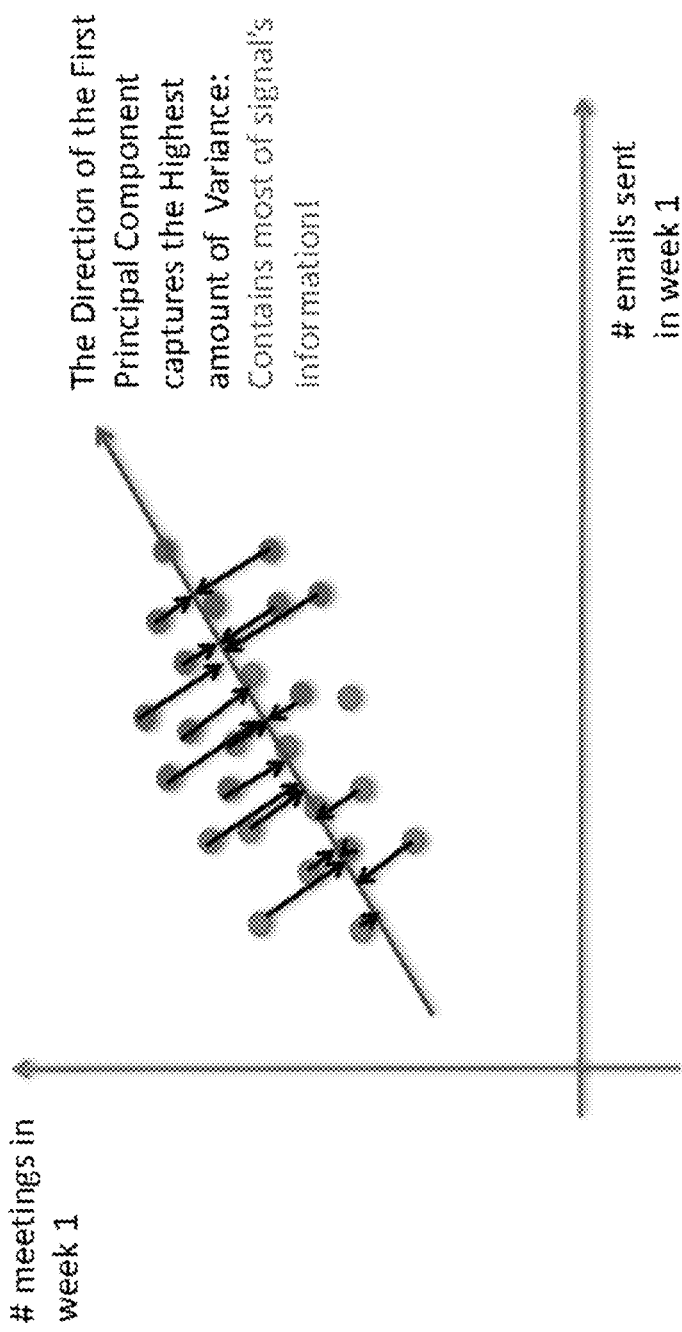
Figure 8D:
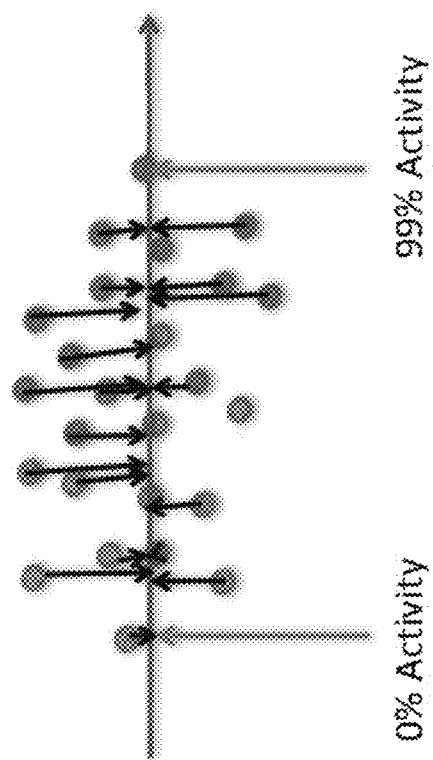

In applying the PCA to the data matrix of metrics of tasks, the PCA analysis is performed to extract the top eigenvector of its covariance matrix ($\Sigma$). For example, as shown in FIG. 8A, a set of metrics representing meetings conducted in week 1 and the emails sent in week 1. The top eigenvector keeps the dimension (w) with the maximum variance. The top principal vector can be identified by solving the equation above, as shown in FIG. 8B. After we obtain the principal dimension, for example, in a form of a scoring model, one can project any task's metrics over it as one data point representing an activity score for the corresponding task using the scoring model, as shown in FIGS. 8C and 8D. A range of values can be assigned to the dimension (e.g., ranging from 0.0 to 1.0) for mapping particular metrics to the assigned values on the dimension in order to determine an activity score.

For example, if the metrics of a particular task x=[1, 0.5], while the principal dimension w=[0.24, 0.97]. the scoring model can project the metrics onto the principal dimension to generate an activity score based on the inner product between the x and w as x^T w. In the above example, the activity score will be 0.24*1+0.97*0.5=0.725. Similarly, for metrics of [0.1, 0.2], the activity score will be 0.24*1+ 0.97*0.2=0.218. A task with a higher activity score will likely completed on time, while a task with a lower activity score will likely not to be completed. The above process is referred to as an unsupervised method.

Figure 9:
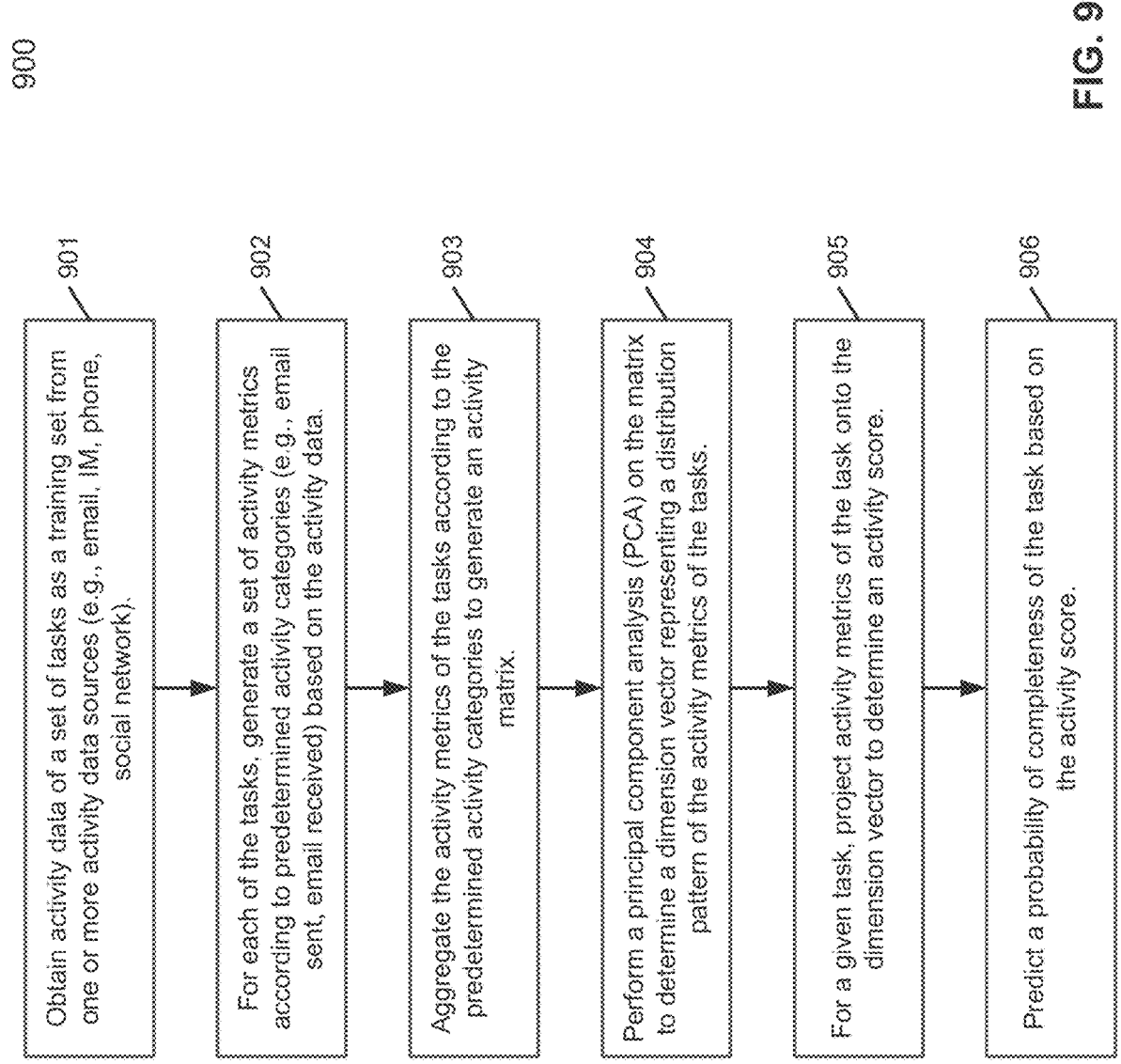
FIG. 9 is a flow diagram illustrating a process of determining an activity score according to one embodiment.

FIG. 9 is a flow diagram illustrating a process of determining an activity score according to one embodiment. Process 900 may be performed by processing logic which may include software, hardware, or a combination thereof. For example, process 900 may be performed by system 200 of FIG. 2. Referring to FIG. 9, in operation 901, processing logic obtains activity data (e.g., emails sent and received at certain time) of a set of tasks as a training set from one or more activity data sources (e.g., email, calendar, IM, social network). The training set may be the current tasks or projects to be completed or alternatively, they can be a set of known tasks or projects that have been completed or failed to complete. In operation 902, for each of the tasks, processing logic generates a set of activity metrics according to a set of predetermined activity categories (e.g., emails sent yesterday, a week ago, a month ago) based on the activity data.

In operation 903, processing logic aggregates the activity metrics of all of the tasks to generate a data matrix. In operation 904, processing logic performs a PCA analysis on the metrics of its covariance matrix to determine a dimension vector representing a distribution pattern of the activity metrics of the tasks. In operation 905, for a given task (e.g., a task with unknown probability of completeness), processing logic projects the activity metrics of the task onto the dimension vector to calculate a single activity score. In operation 906, processing logic estimates a probability of completeness of the task based on the activity score.

In addition to the unsupervised method using a PCA analysis performed on a data matrix, according to another aspect of the invention, a supervised method can also be utilized to create an activity scoring model or algorithm based on a data matrix. According to one embodiment, a first set of known tasks that have been completed and a second set of known tasks that were failed to complete in the past are identified as a training set. Activity data of these known tasks are obtained from various communication platforms such as email, calendar, IM, phone, social platforms. A data matrix is generated for the completed tasks and the incomplete tasks, respectively, using at least some of the techniques described above.

In one embodiment, a linear discriminant analysis (LDA) is performed on the matrixes to find a dimension vector, such that a task with a higher activity score tends to be a completed task, while a task with a lower activity score tends to be an incomplete task. The dimension vector will separate the completed tasks and the incomplete tasks, while completed tasks and the incomplete tasks are close to each other.

Linear discriminant analysis is a generalization of Fisher's linear discriminant, a method used in statistics, pattern recognition and machine learning to find a linear combination of features that characterizes or separates two or more classes of objects or events. The resulting combination may be used as a linear classifier, or, more commonly, for dimensionality reduction before later classification. LDA works when the measurements made on independent variables for each observation are continuous quantities. When dealing with categorical independent variables, the equivalent technique is discriminant correspondence analysis.

Using LDA analysis, a dimension vector (w) can be determined by maximizing the following equation:

$$\text{maximize}_w \frac{w^T(\mu_1-\mu_2)(\mu_1-\mu_2)^T w}{w^T\left(\sum_1+\sum_2\right)w}$$

Here, µ1 represents a mean vector of the metrics of the known completed tasks, while µ2 represents a mean vector of the metrics of the known incomplete tasks. Σ1 represents the covariance matrix of the completed tasks, while Σ2 represents the covariance matrix of the incomplete tasks. T is the transpose operator. For the data matrix as shown in FIG. 7, the mean of "emails sent" metrics would be the mean of (0.8, 0.5, 1, . . . ). The above equation can also be represented by the following closed-form solution:

$$\omega^*=(\Sigma_1+\Sigma_2)^{-1}(\mu_1-\mu_2)$$

Figure 10A:
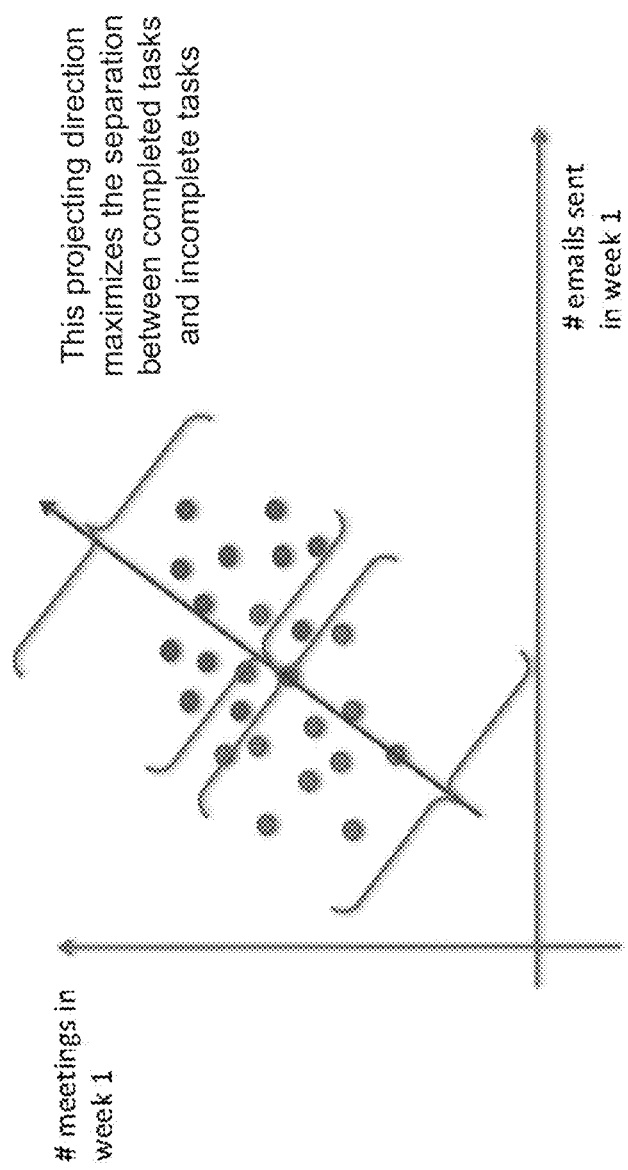
FIGS. 10A-10B are diagrams illustrating a linear discriminant analysis used to determine activity scores according to one embodiment.
Figure 10B:
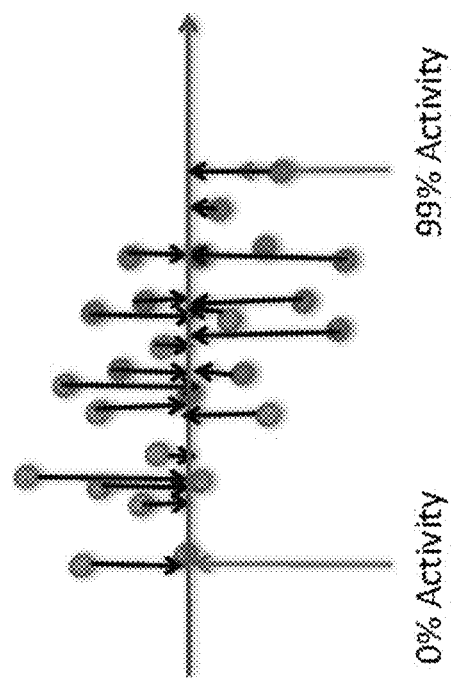

With the LDA analysis, a dimension vector can be determined based on the known complete tasks and the known incomplete tasks as shown in FIG. 10A. Once the dimension vector has been determined, a range of activity score values (e.g., 0 to 1) can be proportionally assigned along the dimension vector and the metrics of unknown tasks can be projected onto the dimension vector, as shown in FIG. 10B, to determine their respective activity scores as described above.

Figure 11:
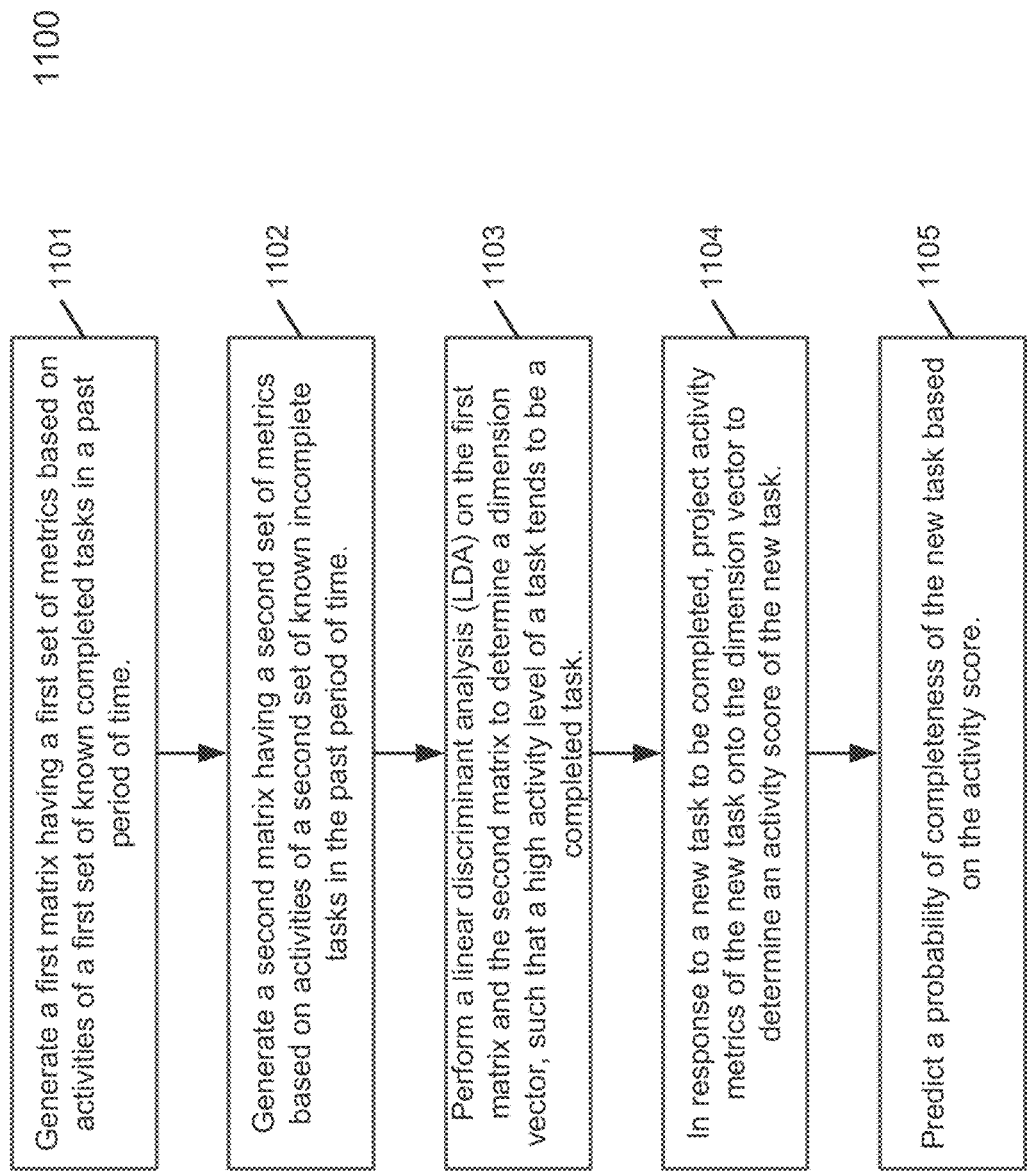
FIG. 11 is a flow diagram illustrating a process of determining an activity score according to another embodiment.

FIG. 11 is a flow diagram illustrating a process of determining an activity score according to one embodiment. Process 1100 may be performed by processing logic which may include software, hardware, or a combination thereof. For example, process 1100 may be performed by system 200 of FIG. 2. Referring to FIG. 11, in operation 1101, processing logic generates a first data matrix having a first set of metrics based on activity data of a predetermined set of activity categories of a first set of known completed tasks in the past period of time. In operation 1102, processing logic generates a second data matrix having a second set of metrics based on activity data of the predetermined set of activity categories of a second set of known incomplete tasks in the past period of time. In operation 1103, processing logic performs an LDA analysis on the first data matrix and the second data matrix to determine a dimension vector, such that a higher activity level of a task tends to be a completed task. Subsequently, in response to a new task to be completed, in operation 1104, processing logic projects the activity metrics of the new task onto the dimension vector to determine an activity score for the new task. In operation 1105, a probability of completeness of the new task can be predicted based on its activity score.

With the activity scores, one can easily determine whether a particular task is likely to be completed. According to another aspect of the invention, a user interface is utilized to present the activity scores of tasks vs. their task scores to users in 2D space, such that the users can visualize the activity scores in view of their task scores. Based on a location within the 2D space, a user can quickly determine whether a particular task is likely to be completed. A task score refers to a numerical value representing certain states or attributes of a task, which may be determined by retrieving attributes of the task from task database system 105. For a project as an example of a task, a task score is also referred to as a project score or a CRM score.

Referring back to FIGS. 2 and 3, according to one embodiment, task manager 213 accesses task database system 105 (e.g., CRM system) to obtain certain attributes of the tasks stored therein, collectively referred to as task data 301. The tasks correspond to the tasks whose activities are collected by activity data collector 110 and analyzed by activity analysis module 211 to generate activity matrix 303. The attributes obtained from task database system 105 may include the current stages of the tasks that represent the progress of the tasks. Alternatively, certain features or statistics associated with the tasks may be collected including, for example, the size of the tasks, an expected complete date of the tasks, whether the expected complete date has been modified, whether the stage or forecast of the tasks have been modified forwardly or backwardly, the time since the last update of a particular field (e.g., if a task stays in the same stage for too long, it tends to be failed to complete), or the remaining time until certain dates or milestones (e.g., time left until the end of the current quarter), etc.

Based on the task data, task scoring module 222 is configured to calculate a task score 302 using a task scoring algorithm or task scoring model as a apart of scoring algorithms or models 235. The task scores are then stored in persistent storage device 203 as part of task scores 234. In one embodiment, a task score of a task is determined based on the stage of the task. A stage of task represents one of the multiple stages as progress indicators or milestones during the life of the task. Each of the stages in the task life is assigned or preconfigured with a task score.

For example, as shown in FIG. 12, each of the task stages, in this example, omitted stage, pipeline stage, upside stage, strong upside stage, and committed stage of a project (e.g., sales opportunity), is assigned with a specific task score in a form of a percentage of completeness. Alternatively, a task score can also be calculated based on other attributes of a task, such as, for example, the size of the task, an expected complete date of the task, whether the expected complete date has been modified, whether the stage or forecast of the task have been modified forwardly or backwardly, the time since the last update of a particular field (e.g., if a task stays in the same stage for too long, it tends to be failed to complete), or the remaining time until certain dates or milestones (e.g., time left until the end of the current quarter), etc.

Similarly, activity score module 221 is configured to calculate an activity score 304 for each of the tasks targeted. The activity scores of the tasks are also stored in persistent storage device 203 as a part of activity scores 233. Based on the activity scores 304 and task scores 302, reporting module 212 can generate a report by plotting activity scores 304 against task scores 302 for each of the tasks in a 2D space, where each task is represented by a graphical representation (e.g., icon) within the 2D space based on its activity score and task score. As a result, a user can easily determine the chances of completing a particular task based on a location of the corresponding graphical representation within the 2D space.

In one embodiment, an appearance of a graphical representation of a task may be determined based on certain attributes of the task. For example, a size, shape, and/or color of a graphical representation may be determined based on a size of the task (e.g., sales contract size) and/or a current progressing or development stage of the task. The graphical representations associated with the tasks are displayed within the 2D space according to their respective task scores (e.g., x-axis) and activity scores (e.g., y-axis), as shown in FIGS. 13A-13E.

Figure 13A:
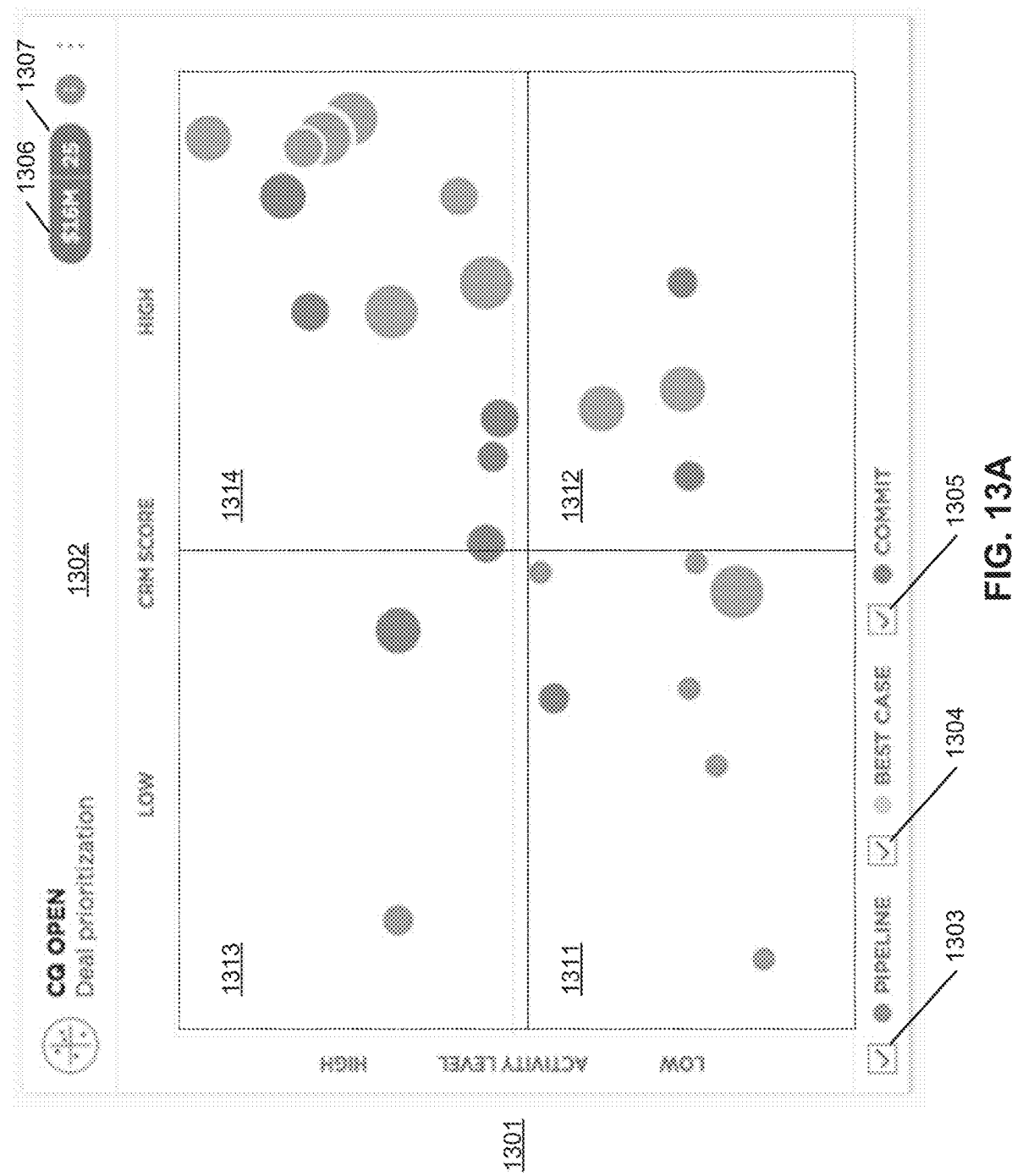
FIGS. 13A and 13B are screenshots illustrating a graphical user interface to display activity scores relative to task scores according to certain embodiments of the invention.

Referring now to FIG. 13A, in this example, a sales opportunity is utilized as an example of a task, where the opportunity management data is maintained by a CRM system. A task score is referred to as a CRM score and a circular dot is utilized as an example of a graphical representation. The size of the circular dot represents a size of the corresponding task and the color of the circular dot represents a development stage of the task. In this particular example, the activity scores are represented on the y-axis 1301 and the task scores are represented on the x-axis 1302, or vice versa. A user can show or hide certain graphical representations based on their attributes. For example, a user can selectively show certain tasks with certain stages via selection boxes 1303-1304. The user can enable or disable displaying the tasks with "pipeline," "best case," and "commit" stages by toggling or switching checkboxes 1303-1305, respectively. On the upper right corner, field 1306 shows the total size of the tasks, while field 1307 shows the total number of the tasks shown in the graphical user interface (GUI).

Figure 13B:
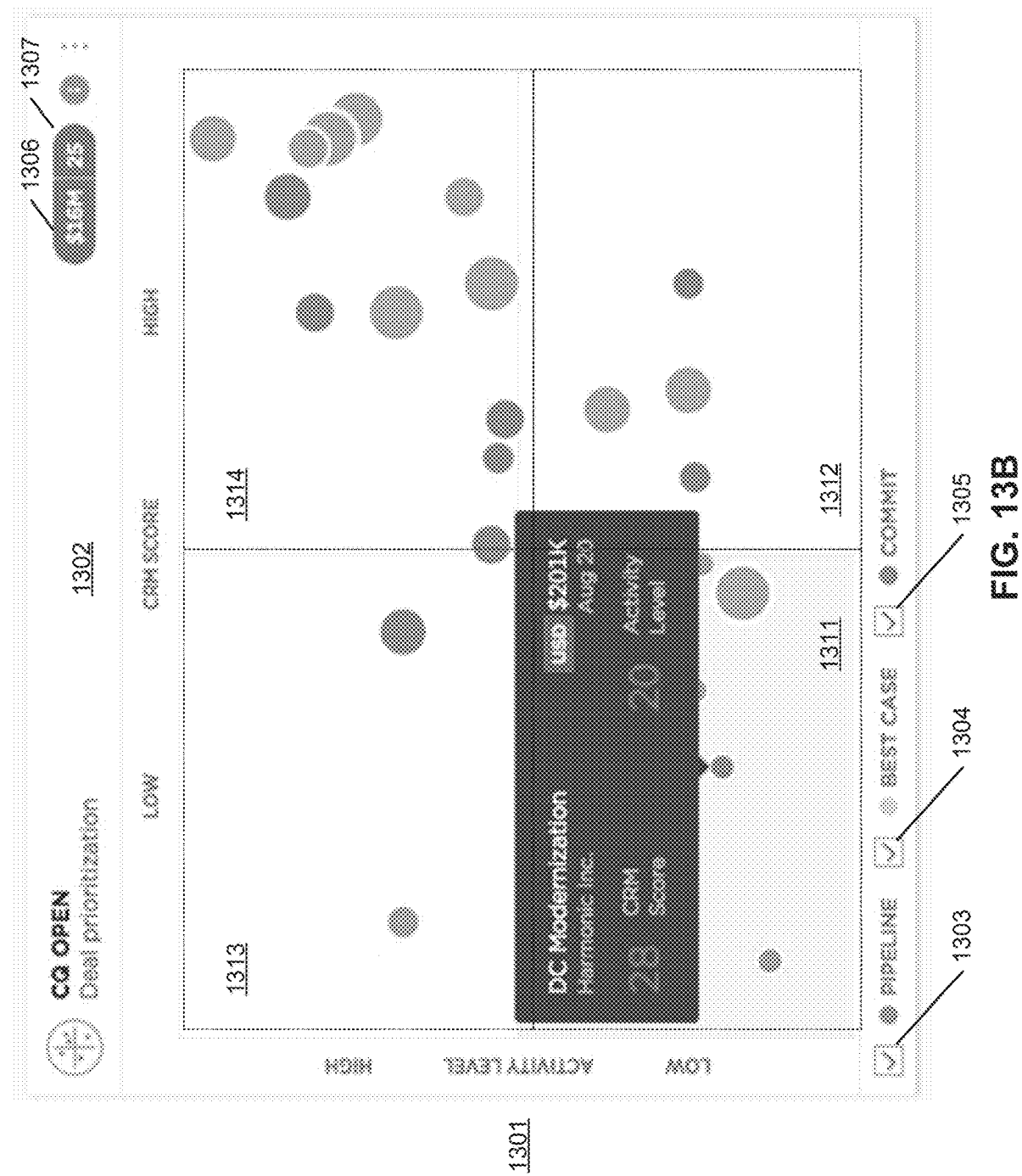

In addition, the graphical representations of the tasks are placed within four quadrants 1311-1314. The graphical representations placed within lower left quadrant 1311 normally have lower activity scores and lower task scores, as shown in FIG. 13B. One can expect that the tasks fall within this quadrant 1311 are unlikely to be completed. This helps the people to start conversation with the team members to make sure these tasks are not inaccurately targeted for the quarter they are currently targeted. Referring to FIG. 13B, when a cursor is placed within a proximity of a particular graphical representation, a pop-up window is displayed to display certain attributes of the corresponding task. The displayed information includes a task score and an activity score of the task. The displayed information may further include an entity name (e.g., customer) associated with the task and the size of the task (in this example, $201K), as well as other information.

When the graphical representations show up in a lower right quadrant 1312, the corresponding tasks would tend to have lower activity scores and higher task scores. These tasks may concern the relevant people in a sense that the team members are inaccurately updating the task database system to show there is a significant progress, but rarely communicating with the customers. The manager can discuss with the team member (e.g., sales representative) regarding the task concerning inaccurate representation in the task database system and can value them less for the probability of completing on time, for example, in the current fiscal quarter. By viewing the locations of the graphical representations, a user would know which task he or she should pay attention.

When the graphical representations show up in an upper left quadrant 1313, the corresponding tasks would tend to have higher activity scores but lower task scores. That means the corresponding tasks are making a significant progress since there are lots of communication activities between the team members and the customers. However, the task database has not been updated up-to-date since the task scores are lower. The manager can communicate with the team members to update the task database. When the graphical representations show up in an upper right quadrant 1314, the corresponding tasks would have higher activity scores and higher task scores. These tasks are likely to be completed on time. Thus, by judging where a graphical representation of a task is located within the 2D space, one can quickly tell whether the task have a higher probability of completeness or incompleteness.

Figure 14:
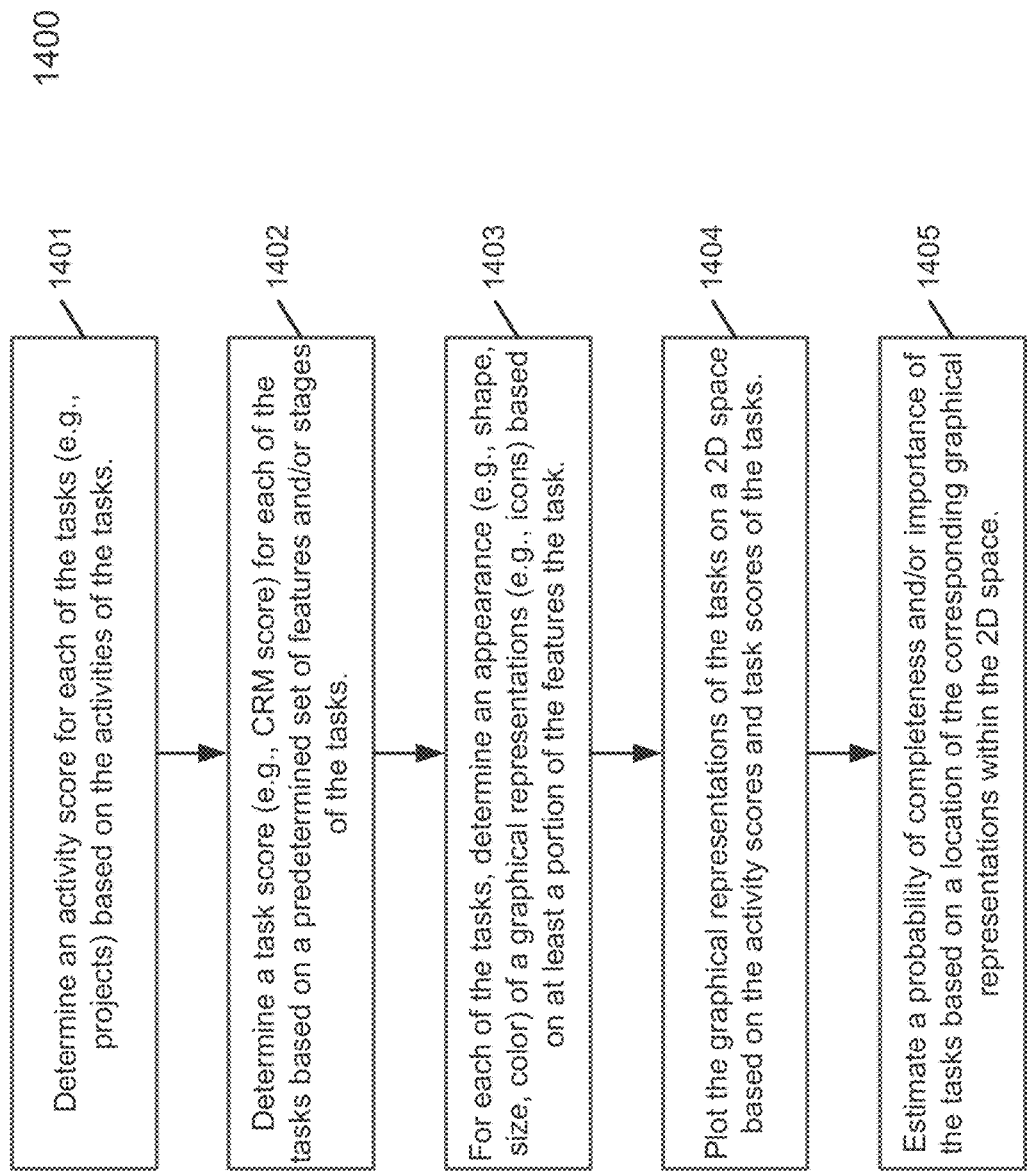
FIG. 14 is a flow diagram illustrating a process of presenting activity scores of tasks according to one embodiment.

FIG. 14 is a flow diagram illustrating a process of presenting activity scores of tasks according to one embodiment. Process 1400 may be performed by processing logic which may include software, hardware, or a combination thereof. For example, process 1400 may be performed by system 200 of FIG. 2. Referring to FIG. 14, in operation 1401, processing logic determines an activity score for each of the tasks (e.g., projects, sales opportunities) based on the activities of the tasks (e.g., emails, IM messages, phone calls, social activities). In operation 1402, processing logic determines a task score (e.g., CRM score) for each task based on a predetermined set of one or more features (e.g., processing stages) of the task. For each of the tasks, in operation 1403, processing logic determines an appearance (e.g., shape, size, color) of a graphical representation (e.g., icon) based on at least a portion of the features of the task. In operation 1404, processing logic plots and displays the graphical representations of the tasks on a 2D space based on the activity scores and tasks scores of the tasks. In operation 1405, processing logic estimate a probability of completeness and importance of each task based on a location of the corresponding graphical representation within the 2D space.

Note that some or all of the components as shown and described above (e.g., activity data collector 110, scoring module 115, machine-learning engine 120, activity analysis module 211, reporting module 212, and task manager 213 of FIGS. 1A-1B and 2) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 15:
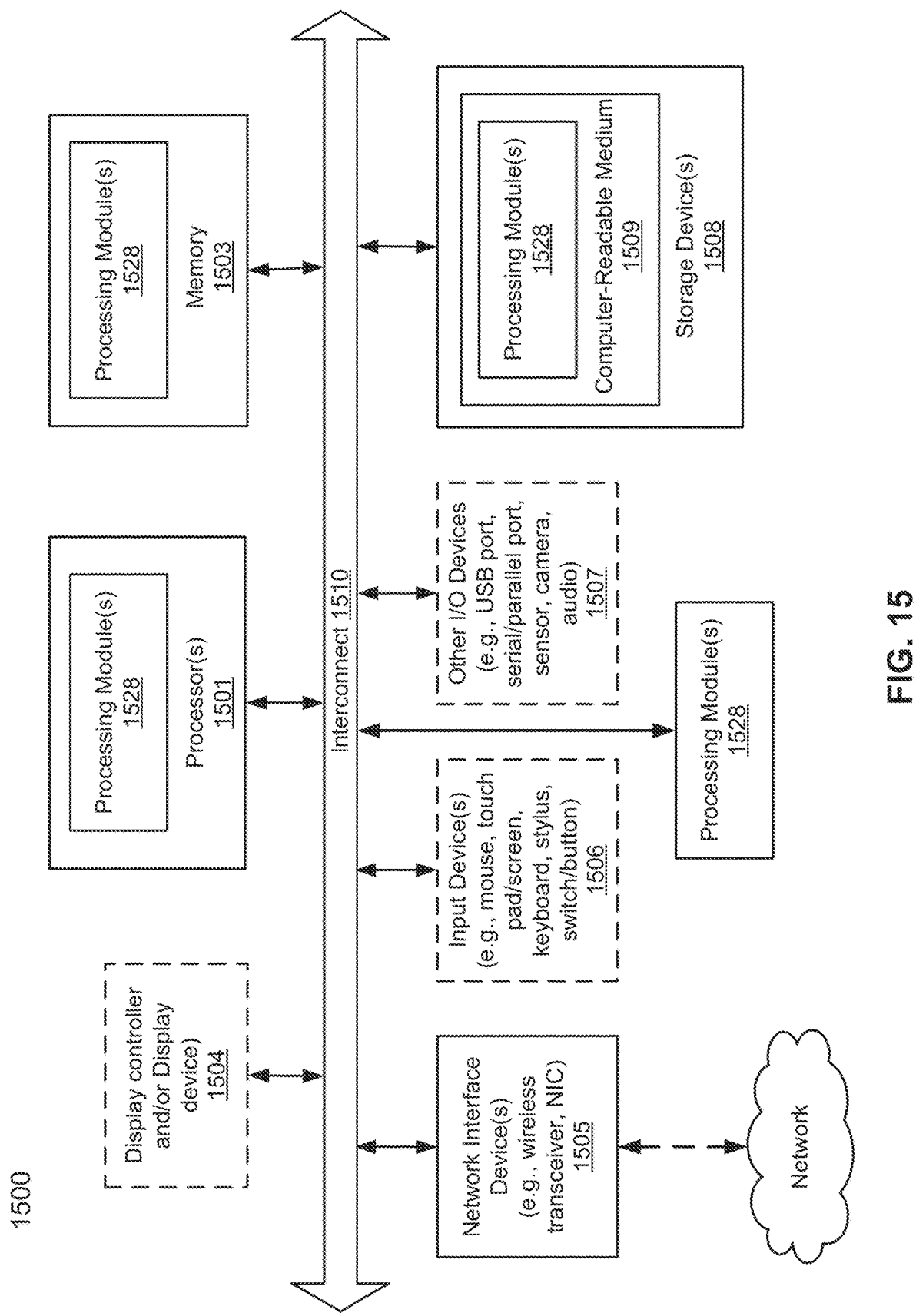
FIG. 15 is a block diagram illustrating a data processing system according to one embodiment.

FIG. 15 is a block diagram illustrating an example of a data processing system which may be used with one embodiment of the invention. For example, system 1500 may represent any of data processing systems described above performing any of the processes or methods described above, such as, for example, a client device or a server described above, such as, for example, clients 101-102 and servers 104-107 of FIGS. 1A-1B, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, activity data collector 110, scoring module 115, machine-learning engine 120, activity analysis module 211, reporting module 212, and task manager 213 of FIGS. 1A-1B and 2 of FIGS. 1A-1B and 2, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A computer-implemented method performed at a server having a hardware processor and a memory, the method comprising:
receiving, at the server, a request from a client device to determine a probability of completeness of a first task, the request includes a first task identifier (ID) identifying the first task;
in response to the request, accessing a task database via a first application programming interface (API) to retrieve first task data associated with the first task;
accessing a first communication platform via a second API based on the first task data to retrieve first activity data of a plurality of activities associated with the first task;
generating a plurality of first activity metrics of the first activity data according to one or more predetermined activity categories;
applying an activity scoring model on the first activity metrics to determine an activity score for the first task, including projecting the first activity metrics onto an activity vector to generate the activity score, the activity score summarizing all activity metrics associated with the first task, wherein the activity scoring model was generated by:
for each of tasks in a predetermined set, retrieving activity data of the task from one or more communication platforms associated with the task via respective APIs, the activity data including one or more of email messages sent or received, instant messaging (IM) messages sent or received, past or future calendar events scheduled, or phone calls placed or received,
for each of the tasks, compiling a set of activity metrics according to the one or more predetermined activity categories based on the activity data of the task, and
performing machine learning on the activity metrics of the tasks to train and generate the activity scoring model, including performing an analysis on the activity metrics of the tasks to derive the activity vector, the activity vector representing a distribution pattern of the activity metrics of the tasks;
determining the probability of completeness of the first task based on the activity score of the first task; and
transmitting the probability of completeness of the first task to the client device.

2. The method of claim 1, wherein performing an analysis on activity metrics of the activity data matrix comprises performing a principal component analysis (PCA) on the activity metrics of the activity data matrix to derive the activity dimension vector.

3. The method of claim 1, wherein performing machine learning further comprises aggregating the activity metrics of the tasks, including
for each of the predetermined activity categories, determining a plurality of percentiles with a predetermined percentile increment; and
normalizing metric values of corresponding activity metrics of the tasks to generate normalized activity metrics of the tasks, wherein the machine learning is performed based on the normalized activity metrics of the tasks.

4. The method of claim 3, wherein performing machine learning further comprises:
for each of the predetermined activity categories, determining an importance factor associated with the predetermined activity category; and
adjusting corresponding normalized activity metrics associated with the predetermined activity category based on the importance factor.

5. The method of claim 4, wherein an importance factor of a particular activity category is determined based on a timeline during which activities occurred.

6. The method of claim 5, wherein the importance factor is determined based on following formula:

$$\text{Importance factor} = \exp(-\beta \Delta t),$$

wherein $\Delta t$ is a recency value representing how recent a corresponding metric is and $\beta > 0$ is a decaying factor.

7. The method of claim 1, wherein the one or more communication platforms comprise at least one of an email system, a calendar system, an IM system, a phone system, or a social networking platform.

8. The method of claim 1, wherein the predetermined set of tasks comprises a first set of known tasks and a second set of known tasks, wherein the first set of known tasks has been completed in the past and the second set of known tasks failed to be completed in the past.

9. The method of claim 8, wherein performing an analysis on activity metrics of the activity data matrix comprises performing a linear discriminant analysis (LDA) on activity metrics of the first set of known tasks and the second set of known tasks to derive the activity dimension vector.

10. The method of claim 1, wherein the set of activity metrics comprises:
a number of email messages sent within a first predetermined period of time, a number of email messages received within a second predetermined period of time, and
a number of calendar events scheduled within a third predetermined period of time.

11. The method of claim 10, wherein the set of activity metrics further comprises:
a number of IM messages sent within a fourth predetermined period of time, and
a number of IM messages received within a fifth predetermined period of time.

12. The method of claim 11, wherein the set of activity metrics further comprises:
a number of phone calls placed within a sixth predetermined period of time, and
a number of phone calls received within a seventh predetermined period of time.

13. The method of claim 1, further comprising:
determining a task score for the first task based on the first task data using a predetermined task scoring algorithm; and
determining the probability of completeness of the first task based on the activity score and the task score of the first task.

14. The method of claim 13, wherein the task score of the first task is calculated based on a stage on which the first task has progressed.

15. The method of claim 13, further comprising:
projecting the activity score and the task score of the first task onto a two-dimension (2D) space; and
determining the probability of completeness of the first task based on a location within the 2D space that represents the activity score and the task score.

16. The method of claim 15, further comprising:
generating graphics data representing the 2D space with the projected activity score and the task score; and
transmitting the graphics data to the client device over the network, such that the 2D space with the projected activity score and the task score is presented at the client device.

17. A non-transitory machine-readable medium having instructions stored therein, which when executed by a processor, cause the processor to perform operations, the operations comprising:
receiving a request from a client device to determine a probability of completeness of a first task, the request includes a first task identifier (ID) identifying the first task;
in response to the request, accessing a task database via a first application programming interface (API) to retrieve first task data associated with the first task;
accessing a first communication platform via a second API based on the first task data to retrieve first activity data of a plurality of activities associated with the first task;
generating a plurality of first activity metrics of the first activity data according to one or more predetermined activity categories;
applying an activity scoring model on the first activity metrics to determine an activity score for the first task, including projecting the first activity metrics onto an activity vector to generate the activity score, the activity score summarizing all activity metrics associated with the first task, wherein the activity scoring model was generated by:
for each of tasks in a predetermined set, retrieving activity data of the task from one or more communication platforms associated with the task via respective APIs, the activity data including one or more of email messages sent or received, instant messaging (IM) messages sent or received, past or future calendar events scheduled, or phone calls placed or received,
for each of the tasks, compiling a set of activity metrics according to the one or more predetermined activity categories based on the activity data of the task, and
performing machine learning on the activity metrics of the tasks to train and generate the activity scoring model, including performing an analysis on the activity metrics of the tasks to derive the activity vector, the activity vector representing a distribution pattern of the activity metrics of the tasks;
determining the probability of completeness of the first task based on the activity score of the first task; and
transmitting the probability of completeness of the first task to the client device.

18. The machine-readable medium of claim 17, wherein performing an analysis on activity metrics of the activity data matrix comprises performing a principal component analysis (PCA) on the activity metrics of the activity data matrix to derive the activity dimension vector.

19. The machine-readable medium of claim 17, wherein performing machine learning further comprises aggregating the activity metrics of the tasks, including
for each of the predetermined activity categories, determining a plurality of percentiles with a predetermined percentile increment; and
normalizing metric values of corresponding activity metrics of the tasks to generate normalized activity metrics of the tasks, wherein the machine learning is performed based on the normalized activity metrics of the tasks.

20. A data processing system, comprising:
a processor; and
a memory coupled to the processor and storing instructions, which when executed by the processor, cause the processor to perform operations, the operations including
receiving a request from a client device to determine a probability of completeness of a first task, the request includes a first task identifier (ID) identifying the first task;
in response to the request, accessing a task database via a first application programming interface (API) to retrieve first task data associated with the first task;
accessing a first communication platform via a second API based on the first task data to retrieve first activity data of a plurality of activities associated with the first task;
generating a plurality of first activity metrics of the first activity data according to one or more predetermined activity categories;
applying an activity scoring model on the first activity metrics to determine an activity score for the first task, including projecting the first activity metrics onto an activity vector to generate the activity score, the activity score summarizing all activity metrics associated with the first task, wherein the activity scoring model was generated by:
for each of tasks in a predetermined set, retrieving activity data of the task from one or more communication platforms associated with the task via respective APIs, the activity data including one or more of email messages sent or received, instant messaging (IM) messages sent or received, past or future calendar events scheduled, or phone calls placed or received, for each of the tasks, compiling a set of activity metrics according to the one or more predetermined activity categories based on the activity data of the task, and performing machine learning on the activity metrics of the tasks to train and generate the activity scoring model, including performing an analysis on the activity metrics of the tasks to derive the activity vector, the activity vector representing a distribution pattern of the activity metrics of the tasks;

determining the probability of completeness of the first task based on the activity score of the first task; and transmitting the probability of completeness of the first task to the client device.

\* \* \* \* \*